(12) United States Patent
Wu

(10) Patent No.: US 10,326,401 B2
(45) Date of Patent: Jun. 18, 2019

(54) TRACKING CONTROL SYSTEMS FOR PHOTOVOLTAIC MODULES

(71) Applicant: ZHEJIANG TONKING NEW ENERGY GROUP CO., LTD, Jiangshan, Zhejiang (CN)

(72) Inventor: Jian Nong Wu, Zhejiang (CN)

(73) Assignee: Zhejiang Tonking New Energy Group Co., Ltd., Zhejiang (CN)

( * ) Notice: Subject to any disclaimer, the term of this patent is extended or adjusted under 35 U.S.C. 154(b) by 293 days.

(21) Appl. No.: 14/608,837

(22) Filed: Jan. 29, 2015

(65) Prior Publication Data
US 2015/0214885 A1 Jul. 30, 2015

(30) Foreign Application Priority Data

Jan. 30, 2014 (CN) .................... 2014 2 0057701 U
Sep. 5, 2014 (CN) ........................ 2014 1 0452129

(51) Int. Cl.
*H02S 20/32* (2014.01)
*H02S 20/30* (2014.01)
*H02S 20/10* (2014.01)
*F24J 2/52* (2006.01)
*F24J 2/54* (2006.01)

(52) U.S. Cl.
CPC ............ *H02S 20/32* (2014.12); *F24J 2/5233* (2013.01); *F24J 2/5413* (2013.01); *F24J 2/5424* (2013.01); *H02S 20/10* (2014.12); *F24J 2002/5458* (2013.01); *Y02E 10/47* (2013.01)

(58) Field of Classification Search
CPC . H02S 20/30; H02S 20/32; F24J 2/54–2/5431
See application file for complete search history.

(56) References Cited

U.S. PATENT DOCUMENTS

| | | | |
|---|---|---|---|
| 4,072,278 A * | 2/1978 | Petersen | B65H 75/406 191/12.2 R |
| 5,228,924 A * | 7/1993 | Barker | F24J 2/541 136/246 |
| 5,632,823 A * | 5/1997 | Sharan | F24J 2/38 126/602 |
| 7,192,146 B2 * | 3/2007 | Gross | F24J 2/38 359/853 |

(Continued)

FOREIGN PATENT DOCUMENTS

WO WO-2007098734 A2 * 9/2007 ............. H02S 20/00

OTHER PUBLICATIONS

"Truss." Dictionary.com, Dictionary.com, www.dictionary.com/browse/truss.*

*Primary Examiner* — Magali P Slawski
*Assistant Examiner* — William E McClain
(74) *Attorney, Agent, or Firm* — Dinsmore & Shohl LLP

(57) ABSTRACT

The object of the present disclosure lies at least in providing a multi-assembly tracking control system for solar photovoltaic module, which may control multiple sets of photovoltaic module assemblies simultaneously, so as to enable a single-axis tracking in one direction or a two-axis tracking in two directions. It is able to receive the sunlight in a most efficient manner under various climate and deployment conditions, to greatly raise the power generation efficiency and to enhance the stability of the whole system.

15 Claims, 18 Drawing Sheets

(56) References Cited

U.S. PATENT DOCUMENTS

| | | | |
|---|---|---|---|
| 2003/0172922 A1* | 9/2003 | Haber | F24J 2/405 126/600 |
| 2009/0314325 A1* | 12/2009 | Borton | G02B 5/09 136/246 |
| 2010/0101632 A1* | 4/2010 | Kats | F24J 2/5424 136/246 |
| 2010/0139741 A1* | 6/2010 | Wares | F16C 11/04 136/251 |
| 2010/0147286 A1* | 6/2010 | Xiang | F24J 2/5424 126/600 |
| 2010/0175741 A1* | 7/2010 | Thorne | F24J 2/5424 136/251 |
| 2010/0193013 A1* | 8/2010 | Kong | F24J 2/5427 136/251 |
| 2010/0206303 A1* | 8/2010 | Thorne | F24J 2/16 126/696 |
| 2010/0212715 A1* | 8/2010 | Almy | H02S 20/00 136/245 |
| 2010/0212720 A1* | 8/2010 | Meyer | F24J 2/16 136/246 |
| 2010/0258110 A1* | 10/2010 | Krabbe | F24J 2/38 126/605 |
| 2011/0000515 A1* | 1/2011 | Patwardhan | F24J 2/18 136/206 |
| 2011/0017198 A1* | 1/2011 | Ebrahimi | F24J 2/5232 126/602 |
| 2011/0073161 A1* | 3/2011 | Scanlon | F24J 2/38 136/246 |
| 2011/0079214 A1* | 4/2011 | Hon | F24J 2/542 126/573 |
| 2011/0139145 A1* | 6/2011 | Mackamul | F24J 2/541 126/600 |
| 2011/0155218 A1* | 6/2011 | Buchel | F24J 2/523 136/246 |
| 2011/0162691 A1* | 7/2011 | Hartelius | F24J 2/5233 136/246 |
| 2011/0192394 A1* | 8/2011 | Brothersen | F24J 2/5233 126/680 |
| 2011/0203640 A1* | 8/2011 | Domingo Cabo | F24J 2/5424 136/246 |
| 2011/0219759 A1* | 9/2011 | Blitz | F16M 11/08 60/327 |
| 2011/0253195 A1* | 10/2011 | Kim | F24J 2/541 136/246 |
| 2011/0315197 A1* | 12/2011 | Angoli | F24J 2/5241 136/246 |
| 2012/0048340 A1* | 3/2012 | Qadir | F24J 2/38 136/246 |
| 2012/0152312 A1* | 6/2012 | Miller | G01S 3/7861 136/246 |
| 2016/0013751 A1* | 1/2016 | Michotte De Welle | B65H 75/406 191/12.2 R |

* cited by examiner

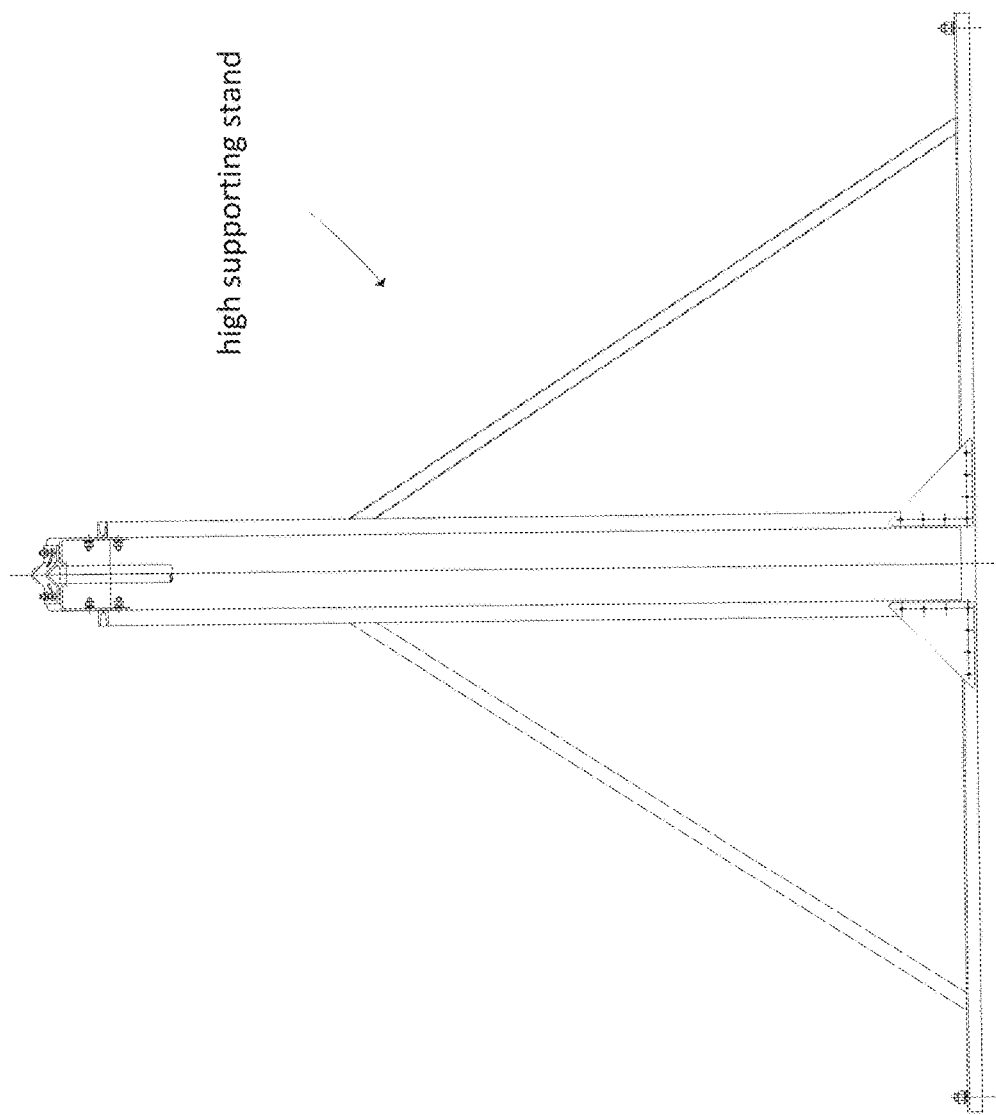

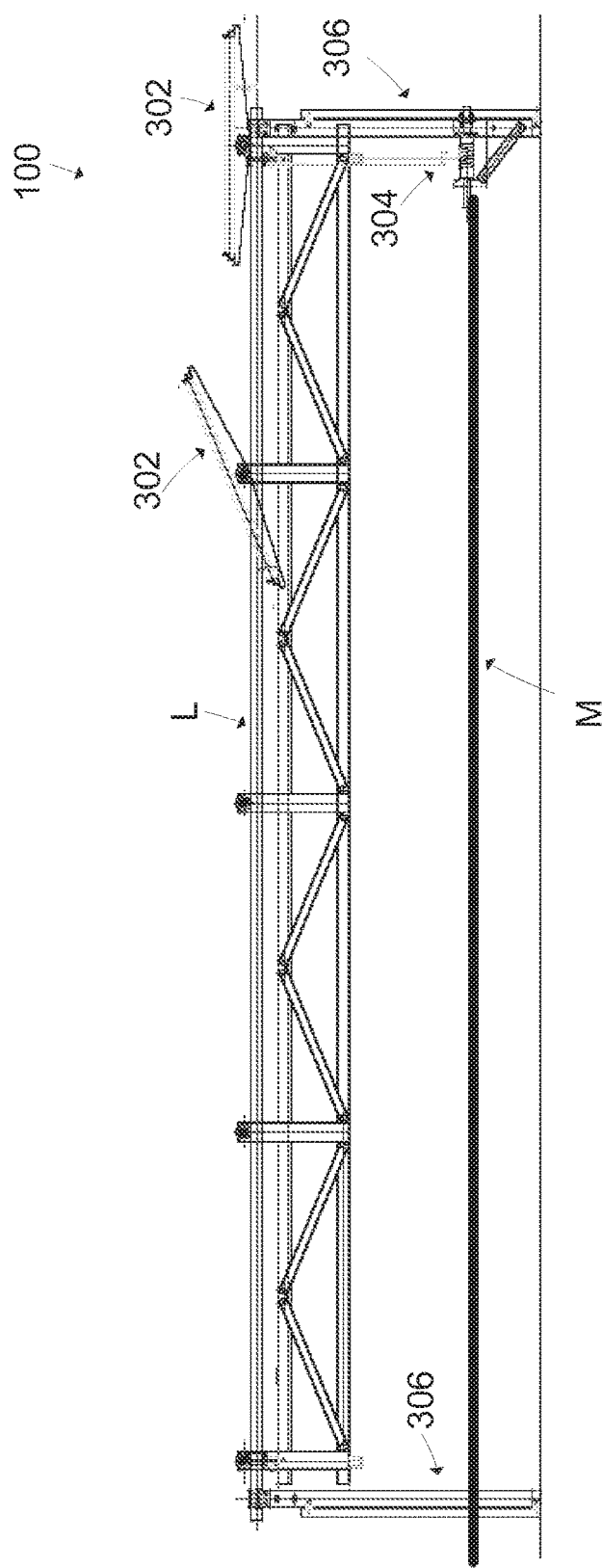

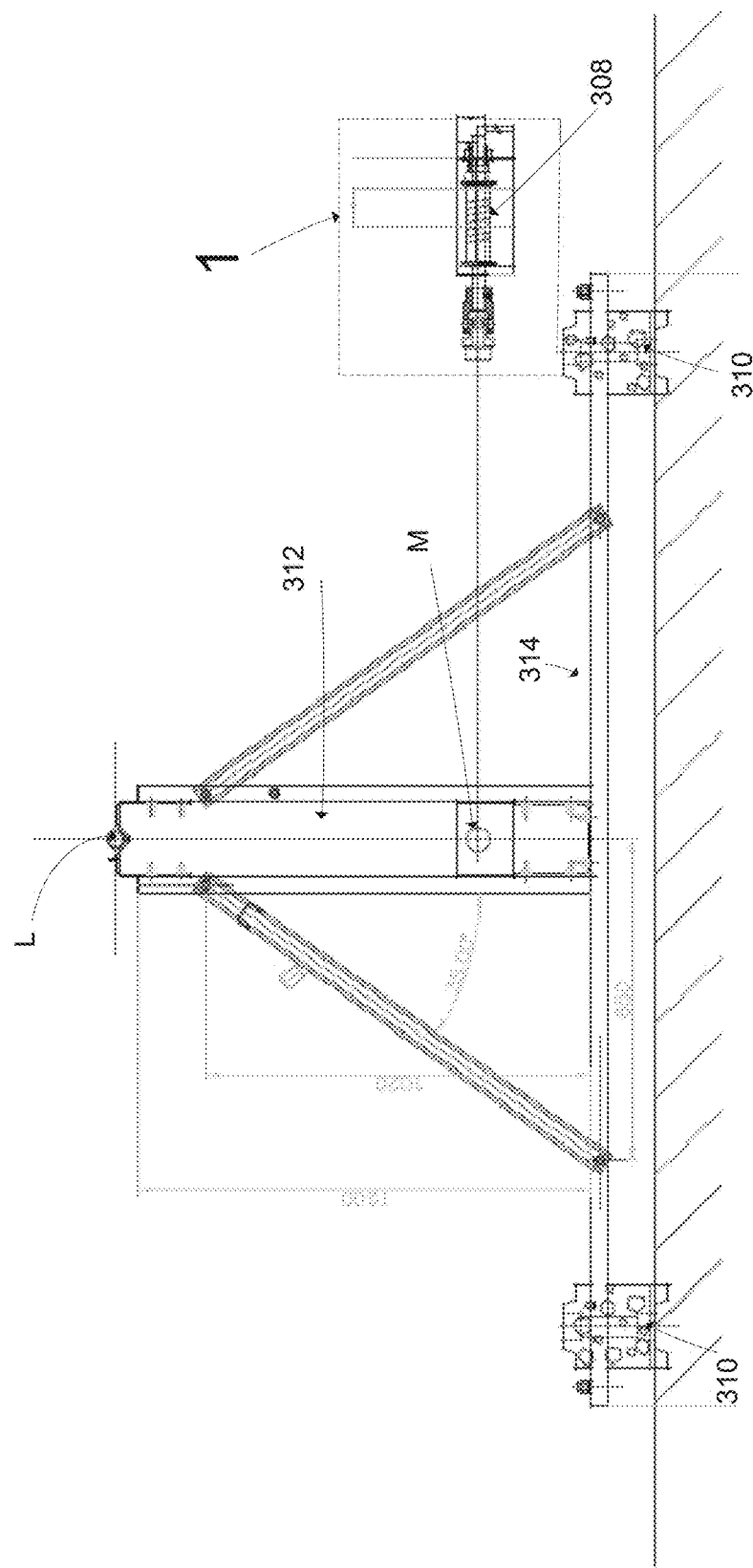

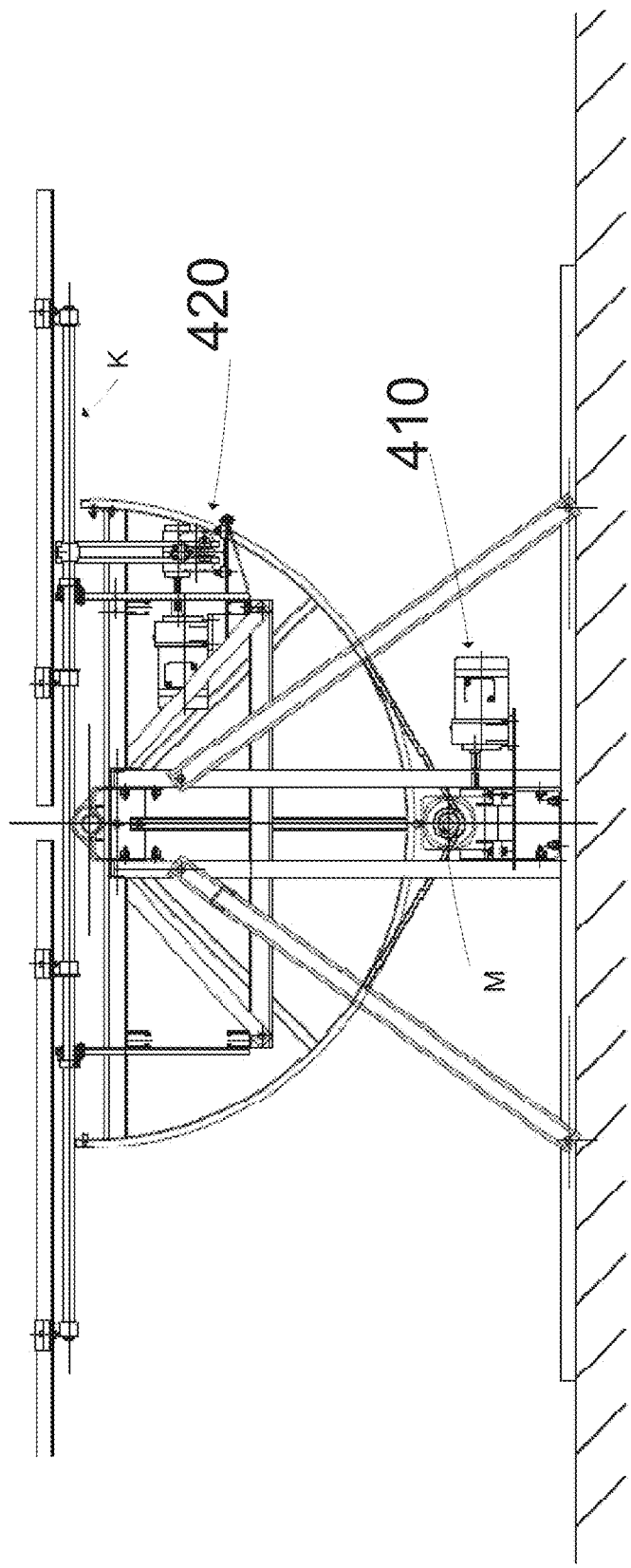

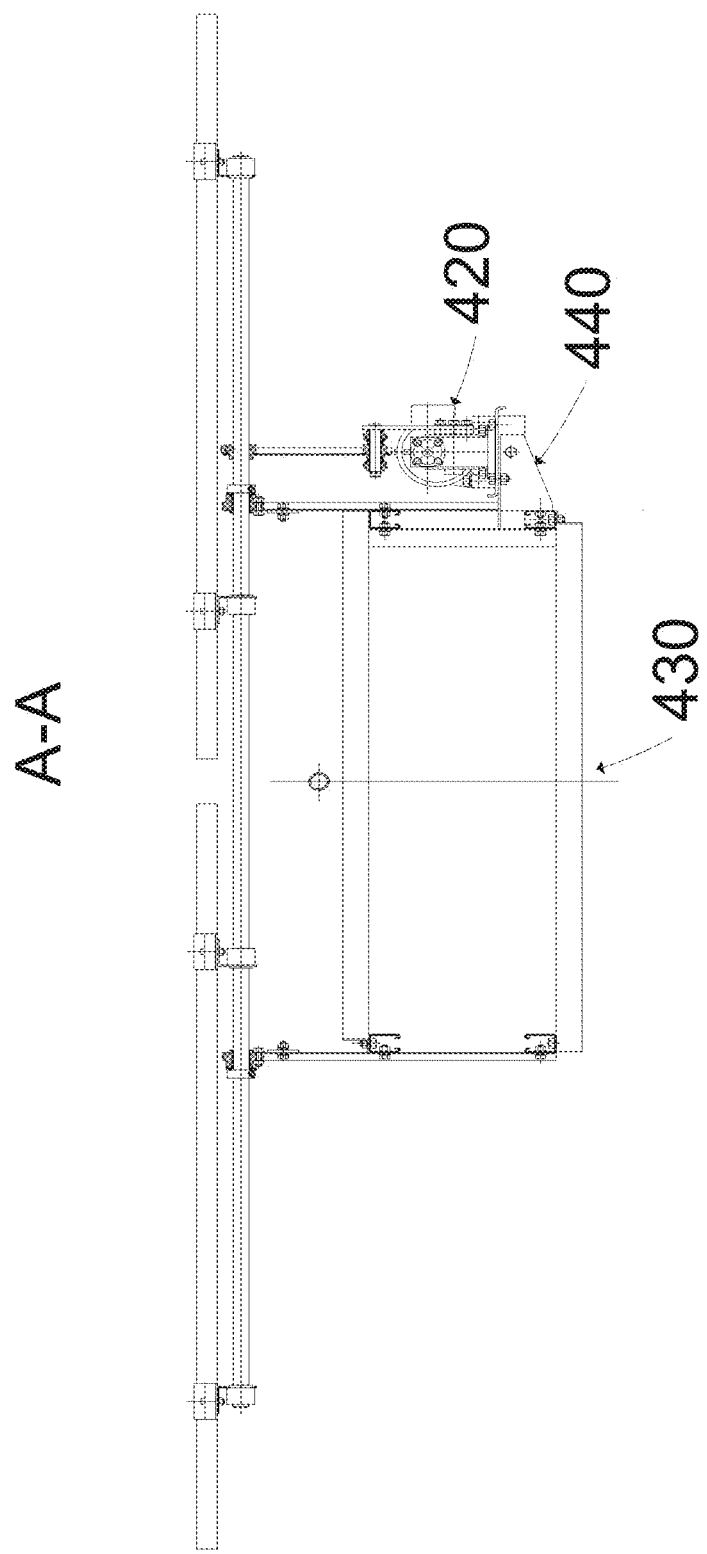

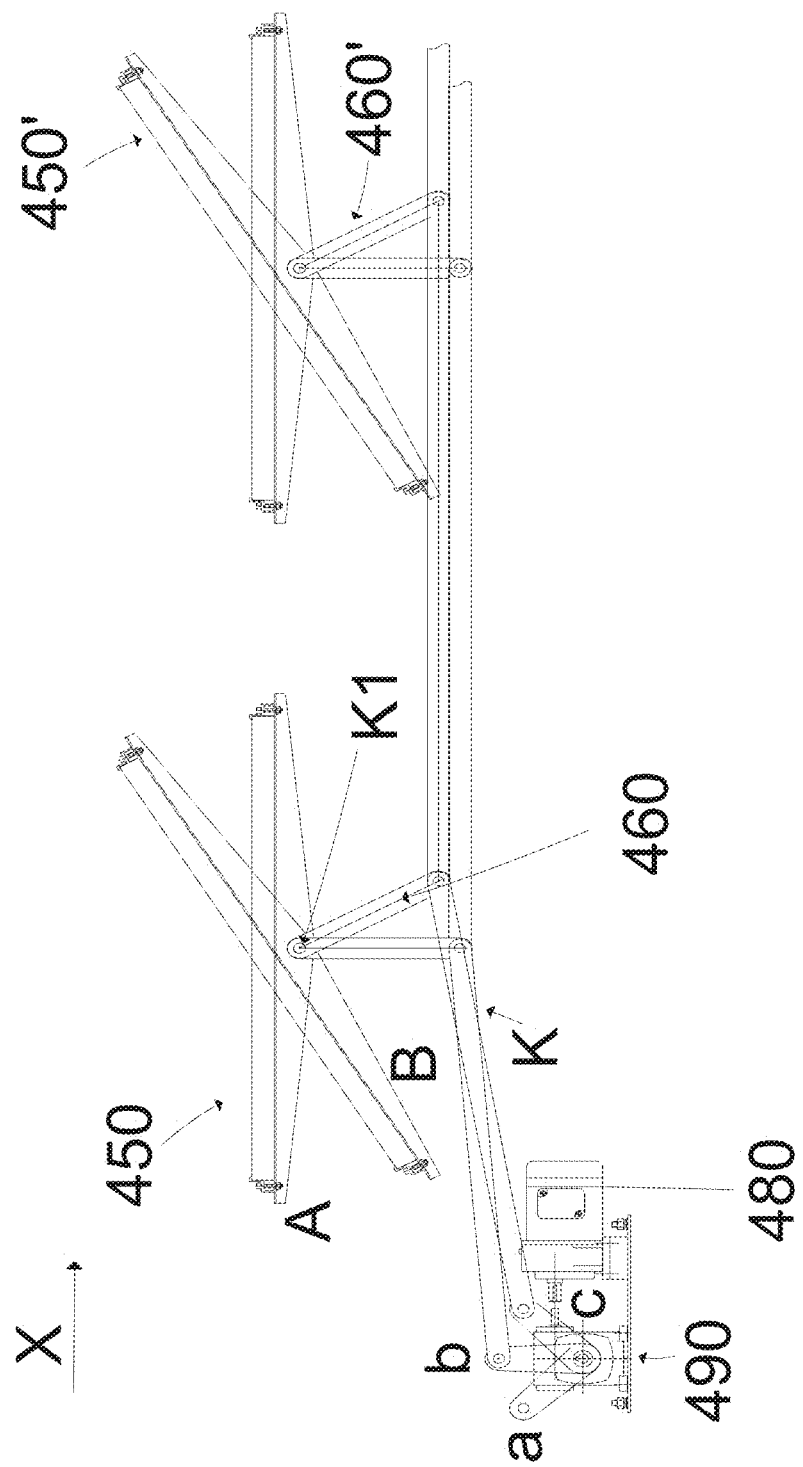

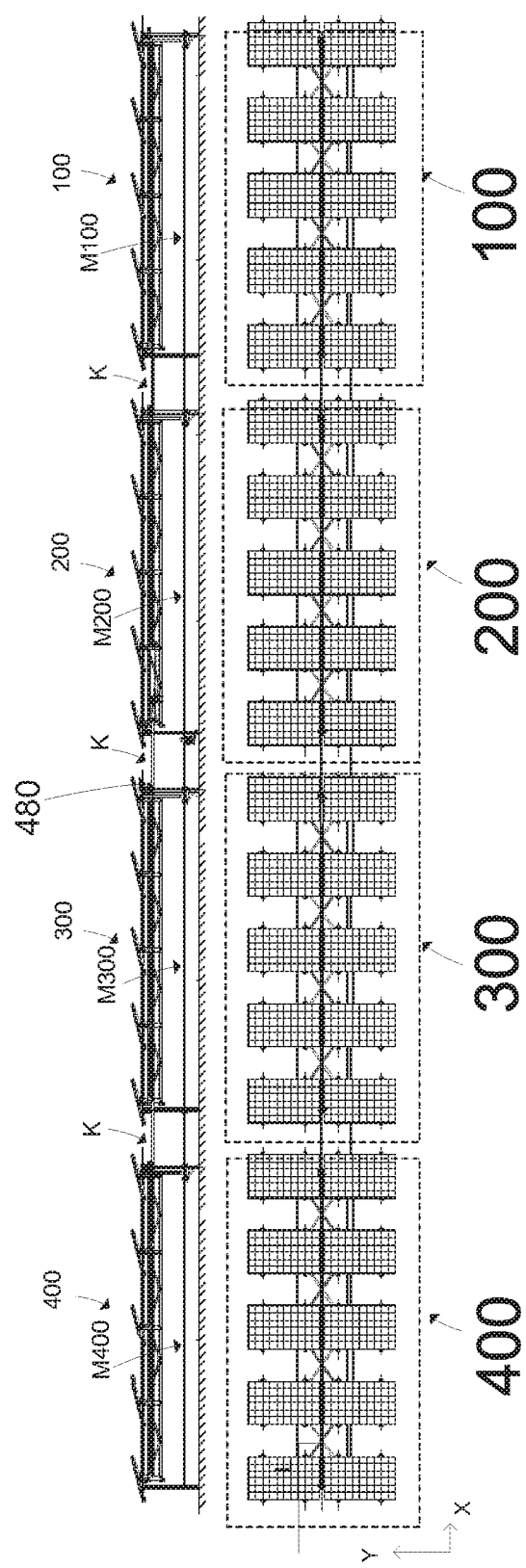

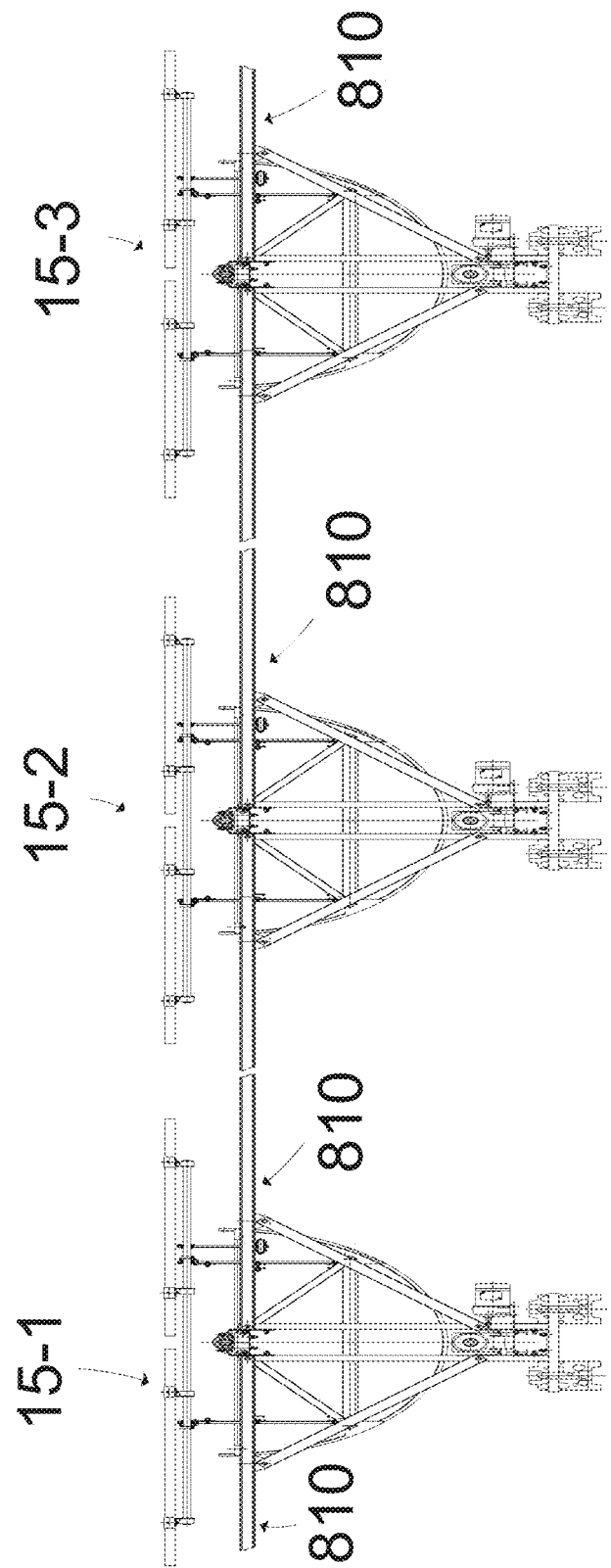

TRACKING CONTROL SYSTEMS FOR PHOTOVOLTAIC MODULES

CROSS REFERENCE TO RELATED APPLICATIONS

The present specification claims priority to Chinese Patent Application No. CN 201420057701.4 filed Jan. 30, 2014 and to Chinese Patent Application No. CN 201410452129.6 filed Sep. 5, 2014, each or which are incorporated by reference herein in their entireties.

BACKGROUND

Field

The present specification generally relates to the field of photovoltaic power generation and, in particular, to a tracking control system for photovoltaic power generation devices.

Technical Background

Solar photovoltaic power generation refers to a technology in which the incident sunlight is received by an array formed by solar photovoltaic module subsystems, converted into electric energy through photovoltaic conversion, and the generated electric energy is collected for use. This technology has the advantages of pollution-free, inexpensive and sustainable power generation, and it is increasingly applied in the tropical or desert regions around the world in which the sunshine conditions are strong.

At present, in the solar photovoltaic power generation system, a large number of assemblies for photovoltaic module subsystems are typically disposed on an open area (or on a surface of a building roof that is directed exposed to sunlight), and on the assemblies, photovoltaic panels are mounted by which the sunlight irradiation is received photovoltaic power generation conversion occurs. In general, according to the terrain of the deployment area, the number of the sets of assemblies can be more than ten, dozens of groups, hundreds of groups or even thousands of groups. Meanwhile, in order to make the photovoltaic module subsystem receive the sunlight better, a solar tracking system for photovoltaic module subsystem has been implemented in the art. By tracking the motions of the sun in real-time and adjusting the orientations of the assemblies of the photovoltaic module subsystem, a perpendicular incidence of sunlight onto the light-receiving plane of the photovoltaic module subsystem is achieved, the amount of solar radiation received by the photovoltaic module subsystem can be increased, and the total amount of power generated by the solar photovoltaic power generation system can be raised.

In brief, the implementation principle of an automatic tracking system for the photovoltaic power generation device is mounting a tracking sensor on the assembly on which the photovoltaic module subsystem is mounted. When the direction of the light changes, the tracking sensor outputs an offset signal, the tracking system starts to operate, adjusts the orientations of the photovoltaic module subsystems on the assemblies until the tracking sensor reaches a balanced state again (i.e. the light-receiving plane of the photovoltaic module subsystem is perpendicular to the incident sunlight), stops the operation, and completes one adjustment. By such continuous adjustment in real-time, it can be ensured that the photovoltaic array module subsystems follow the sun along the traveling tracks of the sun at any time, raising the total amount of generated power. The automatic tracking system can be equipped with a circuit for resisting stray light interference and for night tracking, and equipped with a manual control switch to facilitate the configuration.

The traditional automatic tracking methods for a photovoltaic power generation device generally include: horizontal single-axis automatic tracking, tilt single-axis automatic tracking and two-axis tracking, etc. However, at present, these tracking methods typically implement one control device for one assembly, that is, a single controlling and driving system is used to control a single assembly of a photovoltaic module subsystem. If it comes to a large-scale deployment on a large area, then it requires the number of controlling and driving systems equals to the number of the photovoltaic module subsystems, which substantially increases the deployment costs and deployment difficulties, and is unfavorable for the widely-spread utilization of photovoltaic power generation in under-developed areas. Hence, there is a need for a centralized tracking control system for multiple assemblies of photovoltaic module subsystems.

Due to the daily motion of the sun from east to west, all the tracking systems in the prior art will automatically adjust the orientation according to the motion of the sun. Conventional single-axis systems track the sun motion by fixedly placing themselves in the south-north direction, and adjust and rotate in the east-west direction to track the sun. However, such placement is not the most efficient scheme. Specifically, the central axis of the assembly of the photovoltaic module subsystem has to be placed in south-north direction, and the entire assembly may rotate around its central axis, thereby realizing a deflection of the panel of the photovoltaic module subsystem towards east or west, so as to receive the sunlight better. However, for some areas, due to reasons such as non-horizontal deploying terrains and cloud cover in the sky, even if the assembly is adjustable in the east-west direction, it is still unable to adjust the panel of the photovoltaic module subsystem to be perpendicular to the incident direction of maximal optic axis in case of fixing the assembly in the south-north direction. Therefore, there is also a need for a two-axis tracking system for the photovoltaic module subsystem that is adjustable in both the east-west and the south-north directions.

Meanwhile, for the photovoltaic module subsystems at present, wind resistance is also an important factor to be considered. There are a lot of sunlight and typhoons in southern China, wherein the assembly of the photovoltaic module is exposed to strong winds, and will undergo winds from all directions. The winds will impose lateral and longitudinal pressures on the assembly. This puts high requirements on the wind resistance of the assembly. When skewed by the wind, the weight of the photovoltaic module itself will be sufficient to deviate the center of gravity of the whole assembly, and then make it collapse. Hence, there is a need for an assembly for the photovoltaic module that has good wind resistance.

On the basis of the above requirements, in the field of photovoltaic power generation so far, there is a lack of a tracking system for photovoltaic module which provides tracking control for multiple assemblies of the photovoltaic modules in a centralized manner, can be deployed in large areas on various terrains, and has good wind resistance.

SUMMARY

With regards to the above deficiencies in the prior art, the object of the present disclosure lies at least in providing a multi-assembly tracking control system for solar photovoltaic module. It may control multiple sets of photovoltaic module assembly simultaneously, so as to realize a single-axis tracking in one direction or a two-axis tracking in two directions.

The single-axis tracking system according to the present disclosure has at least the following technical advantages: the sunlight is tracked through inclination in the south-north direction and rotation in the east-west direction, so that the photovoltaic module always forms an optimal incident angle to the sunlight ray, to realize a best absorption utilization of the sunlight. Meanwhile, one set of tracking control systems may be implemented to control and track a plurality of photovoltaic module subsystems, thus substantially reducing the tracking costs, and also efficiently improving the wind resistance of the entire photovoltaic tracking system, thus increasing safety and durability.

The two-axis tracking system according to the present disclosure has at least the following technical advantages: the sunlight is tracked through rotation both in the south-north and east-west directions at the same time, so that the photovoltaic module always forms an optimal incident angle to the sunlight ray at any time, to realize receiving the sunlight in a most efficient manner under various climates and deployment conditions, and the efficiency for power generation may be further raised by 10%-15% with respect to the single-axis tracking system. Meanwhile, one set of tracking control systems may be implemented to control and track a plurality of photovoltaic module subsystems, thus substantially reducing the tracking costs, and also efficiently improving the wind resistance of the entire photovoltaic tracking system, thus increasing safety and durability.

As used herein, the terms "connect" or "couple" are defined as a connection between two subjects, but not necessarily a direct connection therebetween, and they may also comprise an indirect connection relationship achieved via other intermediate node or device.

The terms of "comprise", "have", "include" and "contain" as used herein are open-ended linking verbs. Therefore, a method or a device "comprises", "has", "includes" or "contains" one or more steps or components means that the method or device has said one or more steps or components, but not only said one or more steps or components, instead, it may also comprise one or more further steps or components which are not mentioned herein.

It can be appreciated that the summary and the detailed description of the present disclosure are both exemplary and illustrative, and they are intended to provide a further explanation to the present disclosure as described in the claims.

BRIEF DESCRIPTION OF THE DRAWINGS

The inclusion of the drawings is intended to provide a further understanding of the present disclosure, and the drawings are included and form a part of the present disclosure to illustrate embodiments of the present disclosure and serve in conjunction with the specification to explain the principles of the present disclosure. In connection with the drawings and after reading the following specific non-limiting embodiments of the present disclosure, other features and advantages of the present disclosure will become apparent. In the drawings:

FIGS. 7A and 7B are sectional views of a supporting stand according to an aspect of the present disclosure.

FIGS. 10A, 10B are side and sectional views of different parts of a single module subsystem of a two-axis tracking system according to an aspect of the present disclosure.

FIG. 11 is another side view of a single module subsystem of a two-axis tracking system according to an aspect of the present disclosure.

FIGS. 12A-12C are schematic side views of a single module subsystem 100 which is supplemented with a control motor and a holding block on the basis of FIG. 10A.

FIG. 14 shows a schematic view of multiple module subsystems of a two-axis tracking system according to an aspect of the present disclosure.

FIG. 15 shows a schematic view of two-axis tracking systems, which are organized into a matrix, according to an aspect of the present disclosure.

DETAILED DESCRIPTION

Figure 1:
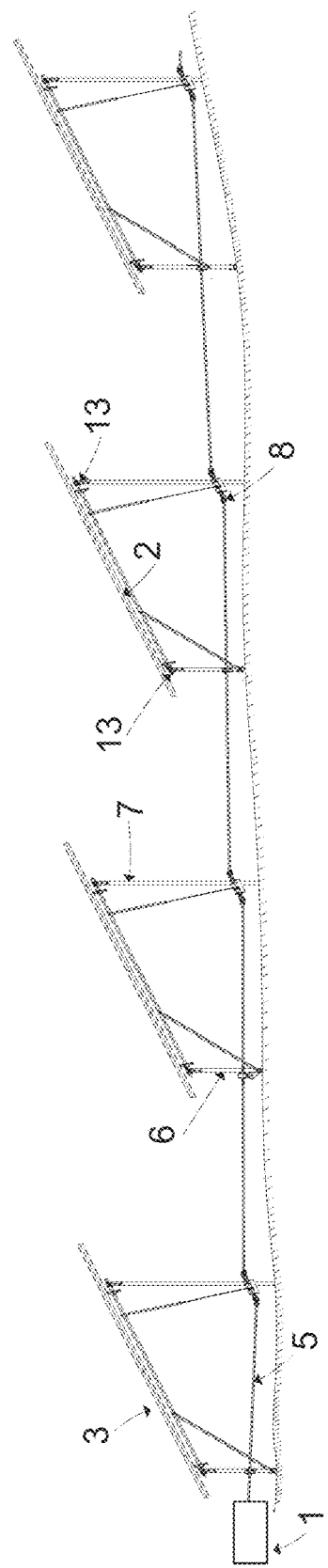
FIG. 1 is a schematic architectural view of a single-axis tracking system according to an aspect of the present disclosure.

With reference to the detailed non-limiting embodiments as illustrated in the drawings and elaborated below, the technical features and details are explained more completely. A description of generally known raw materials, processing techniques, components and devices is omitted in the following description, so as not to unnecessarily obscure the essential technical points of the present disclosure. However, as those skilled in the art will understand, when describing the embodiments of the present disclosure in the following, the description and specific examples are given in an illustrative but non-limiting manner.

Wherever possible, the same reference numerals will be used to represent the same or similar parts throughout the drawings. Furthermore, although the terms as used herein are selected from well-known terms, some terms mentioned in the specification of the present disclosure may be selected by the inventor according his/her own decisions, and the concrete meanings thereof are explained in the respective sections. Moreover, the disclosure shall be construed not only via the actually used terms, but also via the meaning implied by each term.

Improved Multi-Rack Single-Axis Tracking System

FIG. 1 show a single-axis tracking system, which tracks and controls multiple photovoltaic module racks, according to an embodiment of the present disclosure. As can be seen from the side view illustrated in FIG. 1, the tracking system is composed of one transmission control device 1 and several independent photovoltaic tracking subsystems. Further, the transmission control device 1 comprises a controller and a transmission device. A solar motion tracking sensor (not illustrated in the figure) is disposed on the photovoltaic module mounting rack 2. The controller outputs a control signal based on the output signal from the solar motion tracking sensor to drive the transmission device in real-time, rotate the photovoltaic module mounting rack 2, and thus adjust the angle of the photovoltaic module 3 on the photovoltaic module mounting rack 2. The transmission is a device that may rotate the rotation shaft 5 of the photovoltaic tracking subsystem based on the control signal outputted by the controller. The transmission device may be implemented to be a variety of forms, for example, a hydraulic winch, a servomotor, a chain system, or other available transmission systems.

Rotation shaft 5 is parallel to the central line of the light receiving plane of the photovoltaic module 3, so that the traction rope between the photovoltaic module and the driving shaft can rotate perpendicular to the rotation shaft. In one embodiment, in practical use, the single-axis tracking system in FIG. 1 is placed in the south-north orientation, that is, the left side of the side view of FIG. 1 corresponds to the south or the north, while the right side of the side view of FIG. 1 corresponds to the north or the south. As the sun moves from the east to the west every day while the motion in the south-north direction can be ignored, it is apparent that the rotation in the east-west direction is the main rotating direction of the photovoltaic module for facing the sun. Transmission control device 1 may control the rotation of the photovoltaic module 3 in the east-west direction and adjust its tilt angle in the east-west direction to adapt to the motion tracks of the sun every day.

Figure 2A:
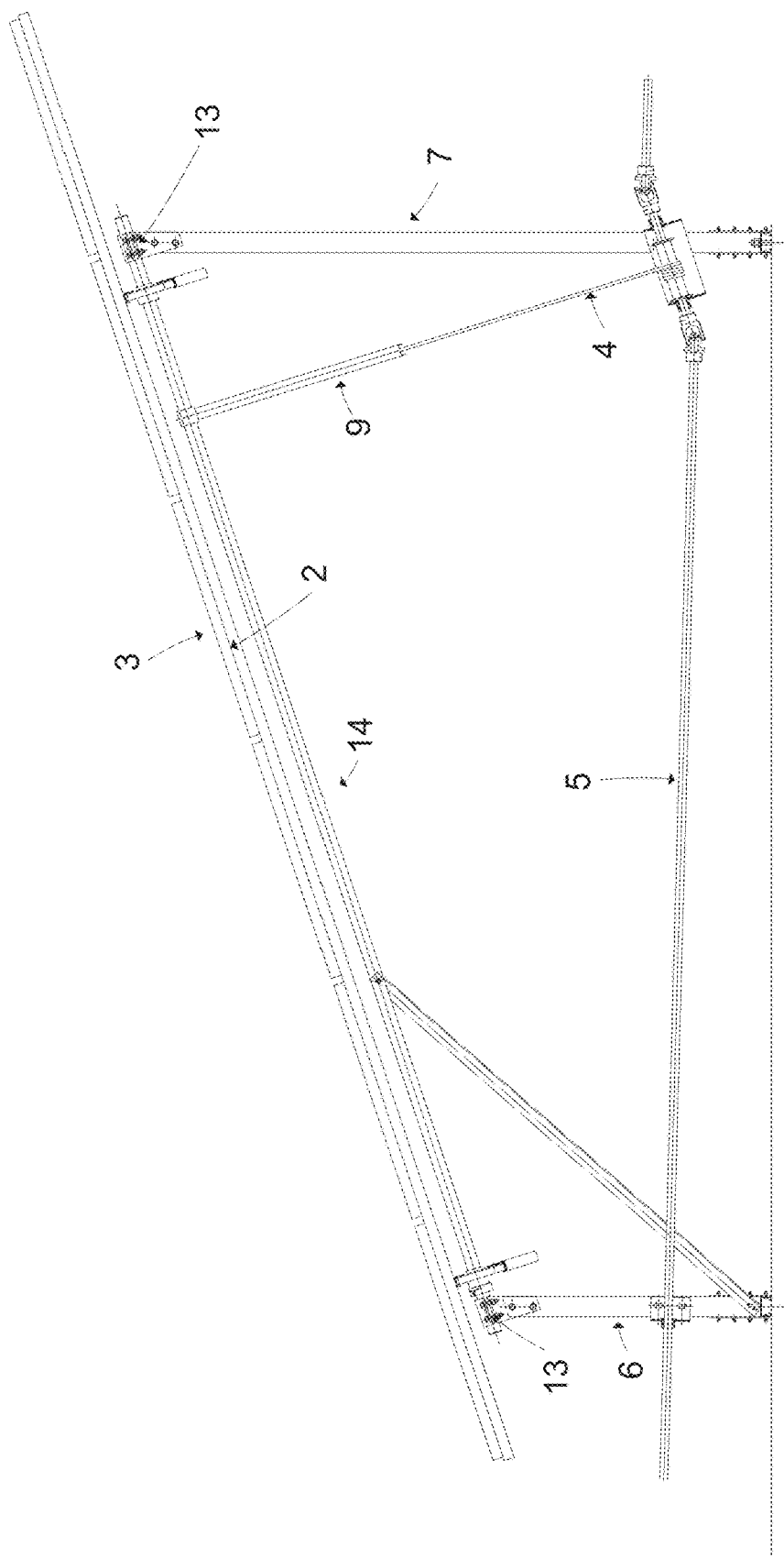
FIGS. 2A, 2B are schematic side and sectional views of a pulling system for a photovoltaic tracking subsystem according to an aspect of the present disclosure.
Figure 2B:
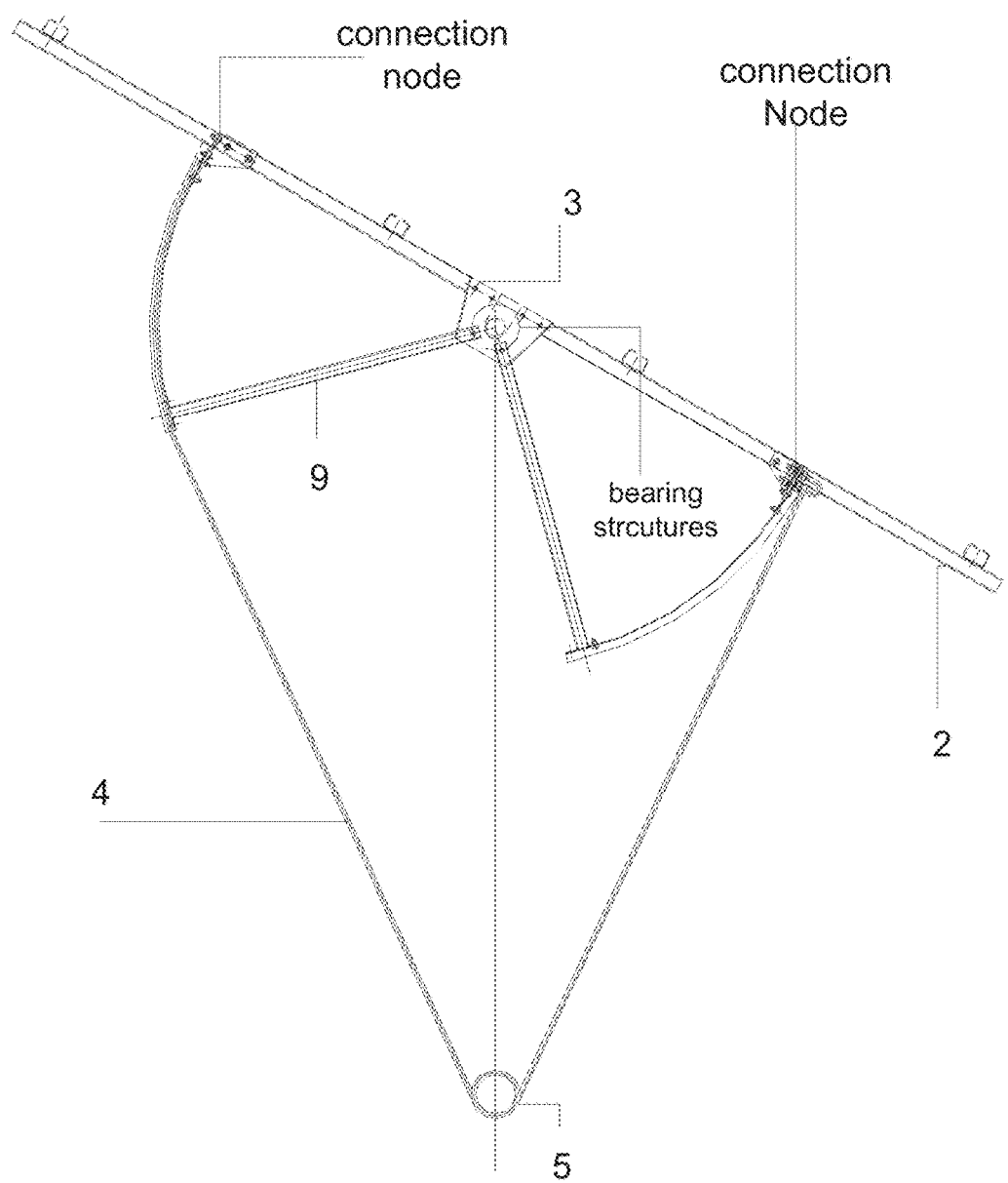

FIGS. 2A and 2B are schematic side and sectional views of each photovoltaic tracking subsystem. As shown in FIG. 2A, each photovoltaic tracking subsystem comprises two fixation supporting stands with different heights (i.e. the high supporting stand 7 and the low supporting stand 6 in FIG. 1), a traction rope 4, a rotation shaft 5, a photovoltaic module mounting rack 2, and a guiding track 9. The photovoltaic module 3 is mounted on the front side of the photovoltaic module mounting rack 2 (the physical body of the photovoltaic module 3 is not shown in the figure). It can be understood that, the photovoltaic module mounting rack 2 has a certain thickness and detailed internal structure, yet for clarity, its thickness is not shown. Bearing structures 13 are disposed along the central line of the photovoltaic module mounting rack 2. A rotating rod 14 passes through the bearing structures. Both ends of the rotating rod 14 pass though the bearing structures 13 on the top of the high supporting stand 7 and the low supporting stand 6. Thus, the mounting rack 2 may rotate around the rotating rod 14. Furthermore, the rotation shaft 5 and the rotating rod 14 are both parallel to the central line of the light receiving plane of the photovoltaic module, so that the traction rope between the photovoltaic module and the driving shaft can be pulled perpendicular to the rotation shaft, thus to enhance the stability of rotation and avoid the risks brought by a skewed traction rope during rotation. The traction rope can for example be made of steel wire ropes.

As can be clearly seen in FIG. 2A, the photovoltaic module mounting rack 2 in the tracking subsystem is deposited on the fixation high supporting stand 7 and low supporting stand 6 with different heights. The high supporting stand 7 and the low supporting stand 6 are triangular as seen from the cross section, with their grounding ends extend towards two sides, to avoid the entire assembly of the photovoltaic module collapsing to the left or right during rotation. The bearing structures 13 are respectively mounted on the pillar tops of both supporting stands so as to flexibly connect with the photovoltaic module mounting rack 2, which enables a rotation of the mounting rack 2 in the east-west direction.

As can be further seen from FIG. 2B, on the front side (the light receiving side) of the photovoltaic module mounting rack 2, a photovoltaic module 3 is mounted. A rotating rod 14 is configured along the central axis. Two connection nodes for a traction rope are provided on the two ends of the back side of the rack 2 at both ends. The traction rope has its both ends connected to the corresponding connection nodes, and is coiled by the rotation shaft 5 in its middle, thereby forming a loop pulling system. Meanwhile, on the back side of the photovoltaic module mounting rack 2, there is also mounted a guiding track 9, which is parallel to the inclined rotating direction of the photovoltaic module mounting rack 2 (i.e. also placed in east-west direction), so as to guide the part of traction rope 4 near the photovoltaic module mounting rack 2 into the guiding track 9. As shown, the parts on the left and right sides of the guiding track 9 that are in contact with the traction rope 4 are shown as arc-shape, which intends to keep the traction rope 4 always in a tensioning state. In order to save material, the parts on the middle lower of the traction track 9 that are not in contact with the traction rope can be truncated, and thus not form a full arc-shape.

Since the rotating rod 14 passes through the bearing structures 13 on the high supporting stand 7 and the low supporting stand 6, the rotating rod 14 may rotate in the bearing structures 13 with a low resistance when the traction rope 4 pulls the photovoltaic module mounting rack 2, thereby enhancing the flexibility of adjustment.

According to an embodiment of the present disclosure, During the tracking control, the transmission control device 1 adjusts the angle based on the signal of the tracking sensor (not shown) as below: the controller determines the rotating direction and the rotating angle based on the signal of the tracking sensor; the rotation shaft 5 is rotated clockwise or anti-clockwise via the transmission device; the clockwise (or anti-clockwise) rotation of the rotation shaft 5 will coil the traction rope 4, shorten the rope at left or right (i.e. along the east-west direction), thus pulling one side of the connected photovoltaic module mounting rack 2, and bringing the photovoltaic module mounting rack 2 into tilt in the west or east direction, thereby adjusting the tilt angle in the east-west direction of the photovoltaic module 3 thereon, so that the photovoltaic module 3 may continuously adjust its light receiving angle in response to the angle variation of the solar motion in a day, which ensures the incident sunlight in a day always forms a right angle to the light receiving surface of the photovoltaic module 3, thus increasing the conversion efficiency and raising the amount of generated power. The guiding track 9 ensures the traction rope 4 always remains in a tensioning state during the rotation, and therefore, in spite of the tilt angle of the photovoltaic module mounting rack 2, the traction rope 4 may always pull the photovoltaic module mounting rack 2 into motion.

Meanwhile, because the photovoltaic module 3 is deployed on the fixed triangular high supporting stand 7 and low supporting stand 6 with different heights, it is naturally inclined in the south-north direction. By configuring the inclination angle in the south-north direction of the photovoltaic module 3 with the height difference of the high supporting stand and low supporting stand, the sunlight is received in a balanced manner in winter and summer. Therefore, in the region where the sunlight angle notably varies in winter and summer, the power generation efficiency may be increased by more than 25% by means of configuring the inclination angle in the south-north direction.

According to another embodiment, multiple tracking subsystems are aligned longitudinally in columns, for example, they can be aligned in a manner shown on the right side of FIG. 1. Each tracking subsystem may have its respective rotation shaft coupled with its respective photovoltaic module via the traction rope and the rotation shafts of multiple tracking systems are connected with each other via universal couplers 8. The universal couplers 8 are arranged at both ends of a single rotation shaft 5, and coupled to the rotation shaft 5 of the previous photovoltaic tracking subsystem and also to the rotation shaft 5 of the next photovoltaic tracking subsystem, so that the rotation shafts 5 of multiple photovoltaic tracking subsystems are coupled with each other, and the rotation shaft of the photovoltaic tracking subsystem in the first place (the leftmost tracking subsystem as shown in FIG. 1) is connected to the transmission control device 1 also via the universal coupler 8. Thus, a single transmission control device 1 is coupled with rotation shafts 5 of said multiple tracking subsystems via the universal couplers 8, and a plurality of tracking subsystems are connected together via the universal couplers 8. In this way, one transmission control device 1 may control rotation shafts 5 of several tracking subsystems in one longitudinal column at the same time, and then coil traction ropes 4 at the same time to control the inclination angle in the east-west direction of multiple photovoltaic modules 3, and to realize the control of the east-west inclination angle of a plurality of photovoltaic modules 3 at the same time, thereby greatly increasing the control efficiency, reducing deployment of single transmission control systems and substantially reducing the costs.

Meanwhile, the universal couplers 8 may ensure that two rotation shafts 5 are coupled at a certain angle, and thus, even if there are height differences on the deploying terrain ground, it may be ensured that the rotation of a former rotation shaft 5 may still bring a latter rotation shaft 5 into rotation. So the longitudinal columns of the tracking subsystems according to the present disclosure may well operate even on a rough terrain surface.

Figure 3:
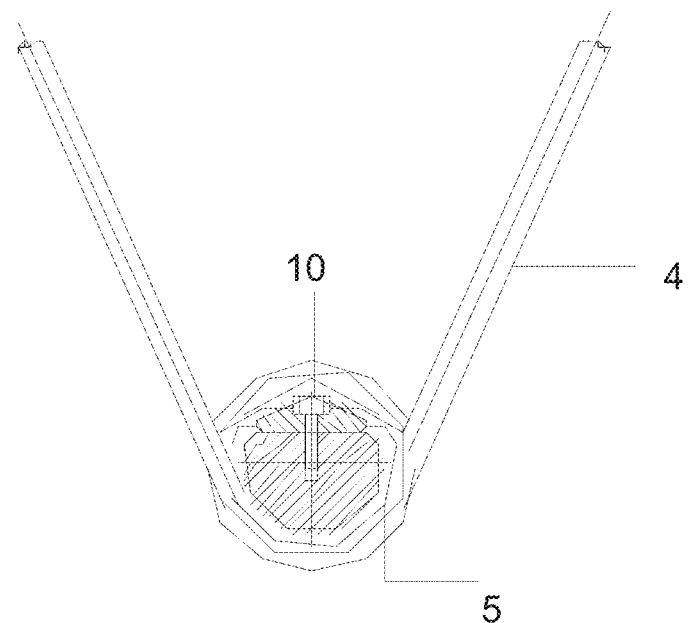
FIG. 3 is a sectional view of a rotation shaft according to an aspect of the present disclosure.
Figure 4:
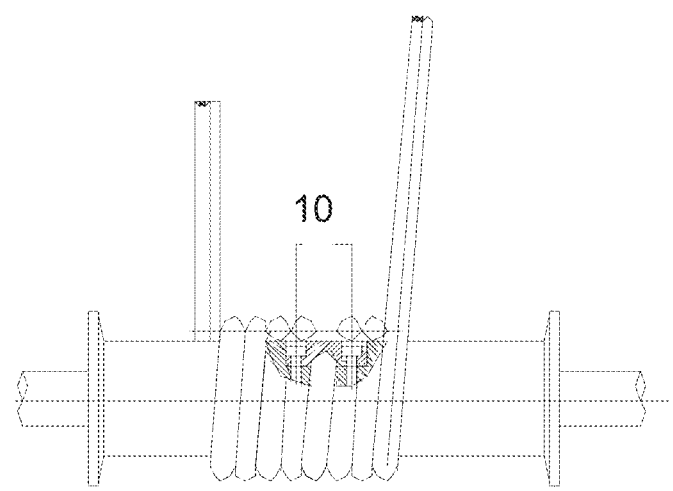
FIG. 4 is a side view of a rotation shaft according to an aspect of the present disclosure.

FIGS. 3 and 4 are a side view and a sectional view of the rotation shaft, respectively. As can be clearly seen from the figure, the traction rope 4 is coiled many rounds around the rotation shaft 5, and the traction rope 4 in the middle part of the coiled segment is nailed into the rotation shaft 5 by using a stop nail 10. It has been found though a long-term research that, compared to a hinge-gear transmission structure commonly used in the prior art, a coiling structure is simpler, and a combination of the stop nail and the traction rope may provide a higher fixation firmness and facilitate a long-term use. Because a photovoltaic system is always placed in an environment of a high temperature and a long-term sunlight, the hinge-gear structure may get stuck due to rusting corrosion. Or in a cold weather, the hinge-gear structure may be frozen and unable to engage, which causes a falling off of the chain. The coiling structure of the traction rope according to the present disclosure does not have the above deficiencies. Through a torsion force generated by a rotation of the rotation shaft, the resistance by rusting or frosting may be overcome, and the traction rope may be coiled efficiently, so that the photovoltaic module mounting rack can be brought into rotation even in a bad weather.

Figure 5:
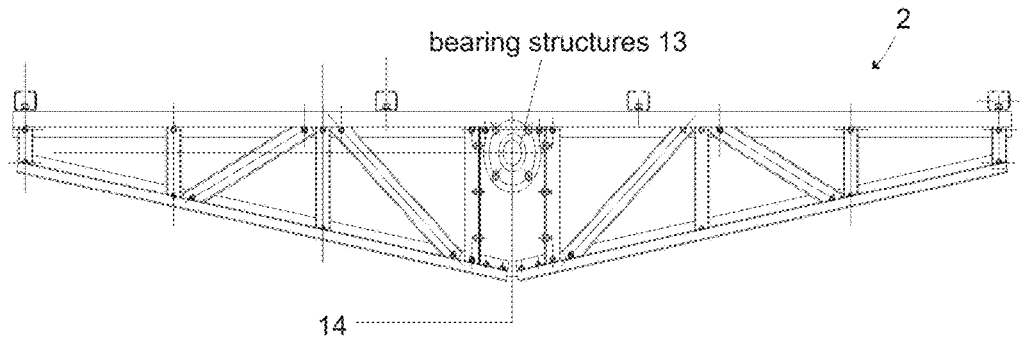
FIG. 5 is an enlarged sectional view of a photovoltaic module mounting rack according to an aspect of the present disclosure.

FIG. 5 is an enlarged sectional view of a photovoltaic module mounting rack 2 according to an aspect of the present disclosure. As can be seen, the front side (upper in the figure) of the photovoltaic module mounting rack 2 is used for mounting photovoltaic module 3 (not shown). A rotating rod 14 is provided along the central axis and is inserted into the bearing structures 13 of the high supporting stand and the low supporting stand of the subsystem. Thus, the photovoltaic module mounting rack 2 is pulled by the traction rope (which is mounted on the back side and not shown in the figure), and a rotation under low resistance can be realized.

Figure 6:
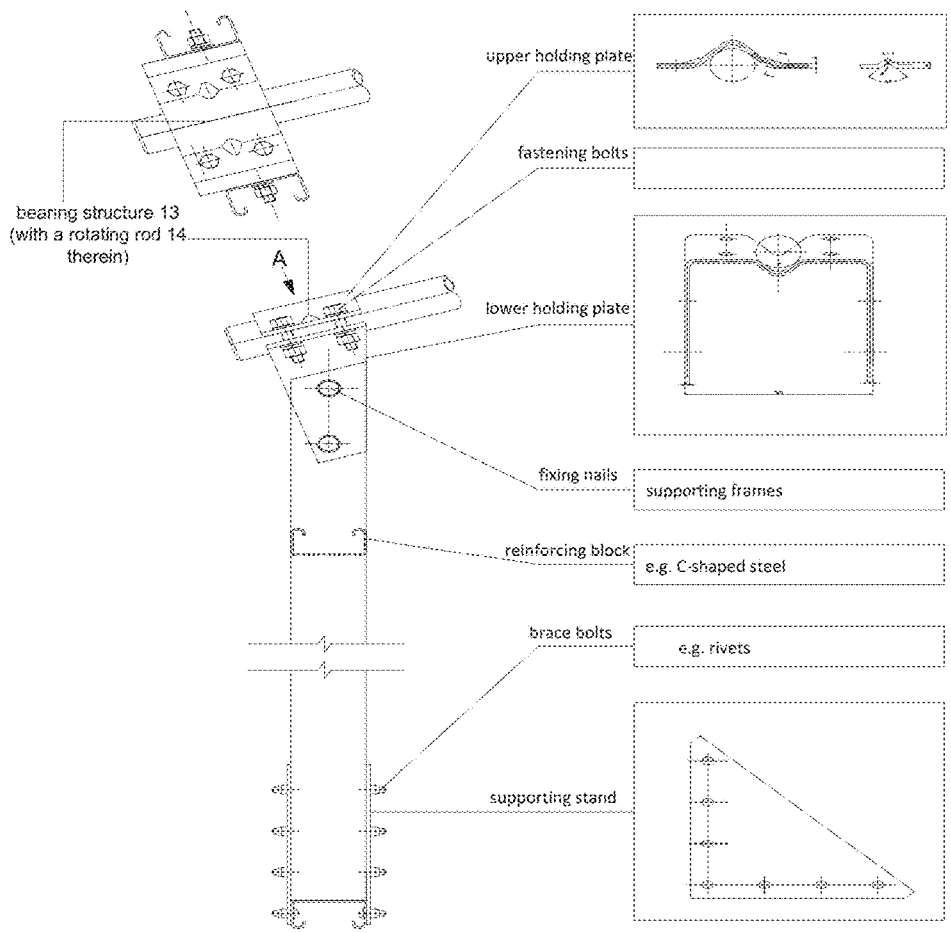
FIG. 6 is an enlarged side view of a connecting part of a supporting stand and a bearing structure according to an aspect of the present disclosure.

FIG. 6 is an enlarged side view of a connecting structure of a high/low supporting stand and a bearing structure according to an aspect of the present disclosure. FIG. 6 shows a fixation connecting structure on a supporting stand (which may be either a high supporting stand or a low supporting stand). It should be understood that such structure is equally applicable to both a high supporting stand and a low supporting stand. The connecting structure, from top to bottom, includes: an upper holding plate and a lower holding plate for fixing the bearing structure 13 (and the rotating rod 14 therein), which are fastened together by multiple fastening bolts (4 bolts in this example, but 2, 6 and etc. bolts can also be used) so as to compact and fix the bearing structure 13 therein; fixing nails used to fix the lower holding plate onto the supporting stand; and a reinforcing block arranged inside the middle segment of pillar body of the supporting stand. According to an embodiment, in order to save materials, the internal structure of the pillar body of the supporting stand may be designed to be hollow, and a deformation of the supporting stand may be efficiently prevented by arranging a reinforcing block inside the middle segment of the pillar body. Alternatively, reinforcing blocks can be omitted, or a solid supporting stand can be used. In the lowest part of the pillar base of the supporting stand which contacts the ground, brace bolts are used to fix the triangular braces on the supporting stand, and the triangular braces are used for securing onto the mounting surface (such as the ground, the roof).

Figure 7A:
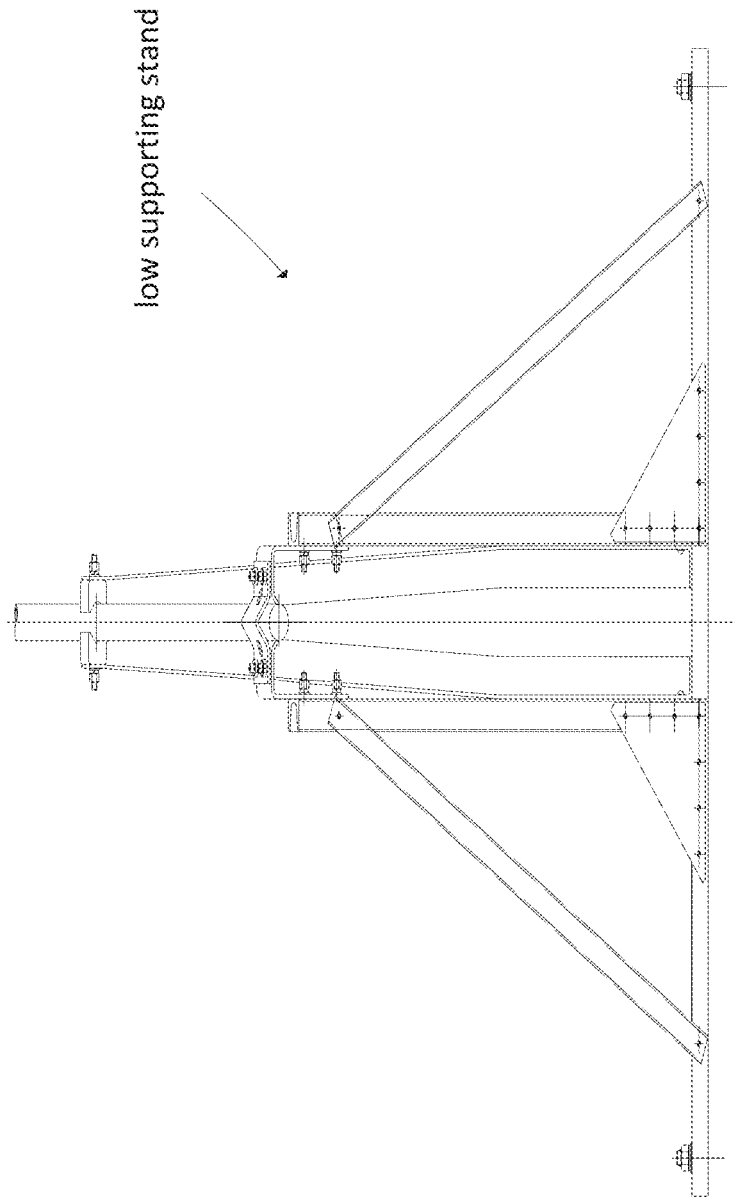

FIGS. 7A and 7B are sectional views of a supporting stand according to an aspect of the present disclosure. As can be seen, the low supporting stand located in front of the subsystem and the high supporting stand behind the subsystem are both implemented as a triangular structure by using a brace structure: a central supporting stand body is set up on a bottom beam and supported by two inclined bracing rods. It has been found by the inventor after research, such structure is more stable, and is more resistant against lateral wind pressure. Although bolts are shown for fixation in FIGS. 7A and 7B, according to an alternative embodiment of the present disclosure, it is not necessary to secure such triangular brace onto the ground (or the roof), while a stable deployment firmness may still be provided. This is advantageous for some cases in which no bores can be drilled on the ground.

A single-axis tracking control system applicable for multi-assemblies has been described above. Multiple photovoltaic module assemblies in a longitudinal column may be rotated by one rotation shaft 5 in one direction, which can be applied to the moving direction of the sun in a day and increases the efficiency of photovoltaic power generation.

However, in some deploying areas, due to reasons such as non-horizontal deploying terrains and clouds cover in the sky, even if a rotating adjustment is possible in one direction (for example the east-west direction), the sunlight incidence may vary in another direction (for example the south-north direction), therefore, a single-axis may be still unable to adjust the photovoltaic module to be perpendicular to the incident direction of the maximal optical axis. Therefore, there is also a need for a two-axis tracking system for the photovoltaic module subsystem that is adjustable in both east-west and south-north directions. In the following, a two-axis tracking system applicable in a multi-rack manner will be described. Wherein, the same or similar components will have the same or similar names, even if they have different reference numerals.

Multi-Rack Two-Axis Tracking System

Figure 8:
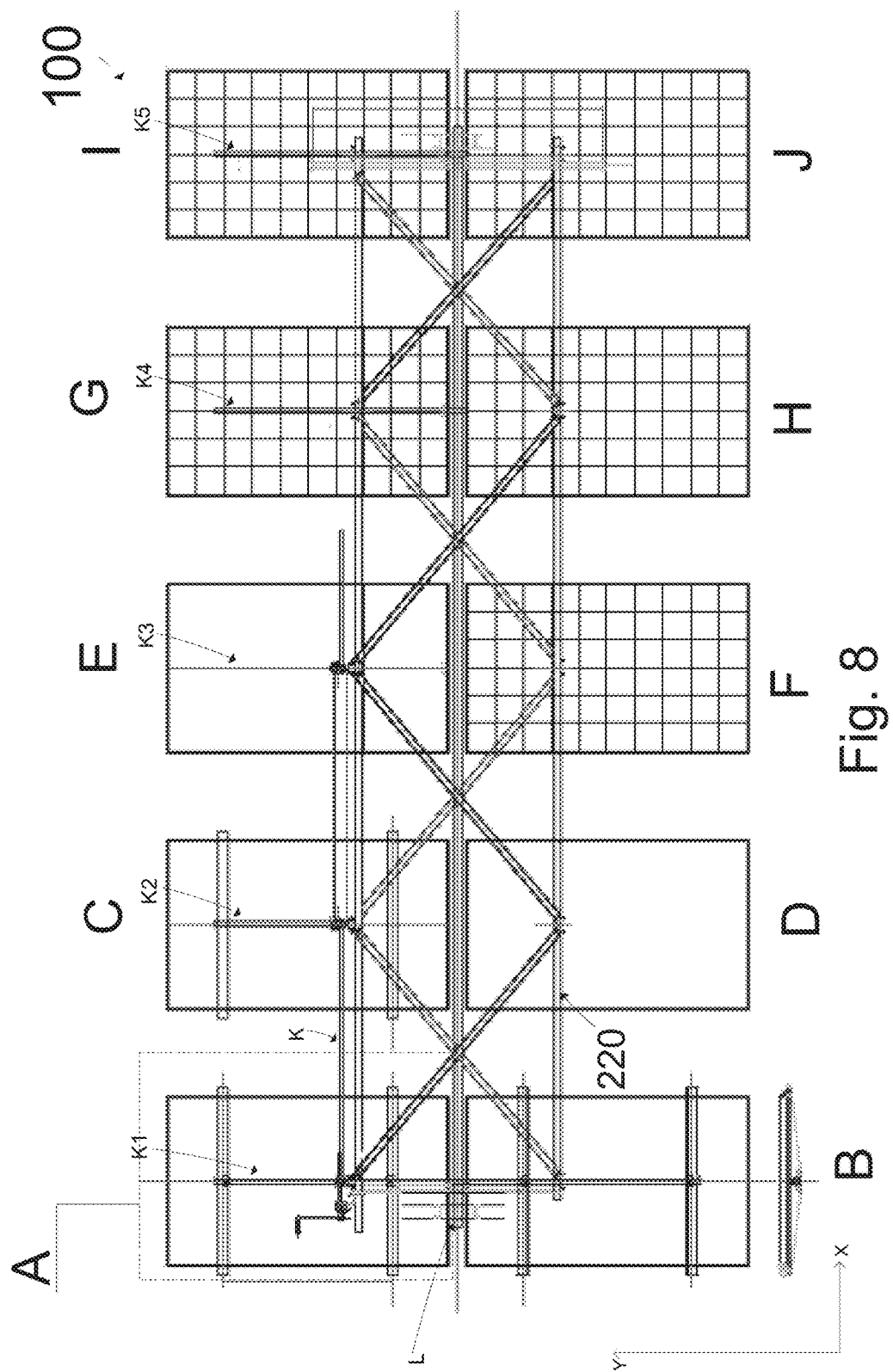
FIG. 8 shows a top view of a single module subsystem of a two-axis tracking system according to an aspect of the present disclosure.

FIG. 8 show a top view of a single module subsystem 100 of a two-axis tracking system, which providing tracking control for multiple photovoltaic module subsystem assemblies, according to an embodiment of the present disclosure. FIG. 8 is a top view looked-down from the sky, and in the horizontal plane on the ground, the X- and Y-directions in the figure are orthogonal. In particular, in an embodiment, the Y-direction is the south-north direction, while the X-direction is the east-west direction. Certainly, since the present disclosure may rotate in both perpendicular axial directions (the X- and Y-directions), the Y-direction may also be set as the east-west direction and the X-direction be set as the south-north direction. The module subsystem 100 comprises: photovoltaic panels, photovoltaic panel mounting positions, a fixing beam truss structure and a supporting structure there below for contacting the bottom ground surface. For the reason of looking-down, the supporting structure is not directly shown in FIG. 8. The fixing beam truss structure is similar to the photovoltaic module mounting rack 2, but it will be further improved for the requirements of the present embodiment. According to an embodiment, the fixing beam truss structure is a frame-shaped, rectangular flat structure which is made of rigid frame bars along the sides of the rectangle, that intersect in the diagonals in the frame for reinforcement purposes. This fixing beam truss structure is advantageous for it is light-weight and of high firmness and not easy to deform. It has a very good tensile resistance in all the three dimensions. The rigid frame bars can be made of metal material that undergoes anti-corrosion processing. For example, the fixing beam truss structure and the supporting structure there below are coupled together using a bearing structure. In particular, a first direction shaft L is fixed on the supporting structure, and the fixing beam truss structure 220 (the structure with intersected beams shown in the figure) passes through the first direction shaft L. Multiple sets of bearing structures are arranged along the central line of the fixing beam truss structure. During the field-installation, the first direction shaft L is inserted to pass through the multiple bearing structures, and thus enabling the entire fixing beam truss structure to rotate flexibly and without friction around the first direction shaft L. Thus, it brings all the photovoltaic panel mounting positions on the rack into a rotation in the Y-direction. On the front side of the fixing beam truss structure facing the sun incidence, multiple photovoltaic panel mounting positions are arranged. In FIG. 8, a photovoltaic panel mounting position is specifically identified by a dashed box in a top view, on which a piece of photovoltaic panel may be covered. Similarly, photovoltaic module subsystem mounting positions B, C, D, E, F, G, L, I, J are shown. Two photovoltaic panel mounting positions are aligned next to each other in a row, and there are 5 rows. Certainly, in other embodiments, more positions may be aligned next to each other in a row, for example, three positions are aligned next to each other in a row, or four positions are aligned next to each other in a row, and so on, and there can be different number of rows. A single two-axis tracking module system in FIG. 8 includes 10 photovoltaic panel mounting positions in total, that is, at most 10 sheets of photovoltaic panels may be mounted. But in another embodiment, the configuring manner in FIG. 8 may be modified so that it provides 2, 4, 6, 8, 10, 12, 14, 16, 18, 20 or more photovoltaic panel mounting positions. This is determined according to the requirements of those skilled in the art and according to the sizes of the photovoltaic panels to be actually mounted, and the present disclosure is not limited in this aspect.

Figure 9:
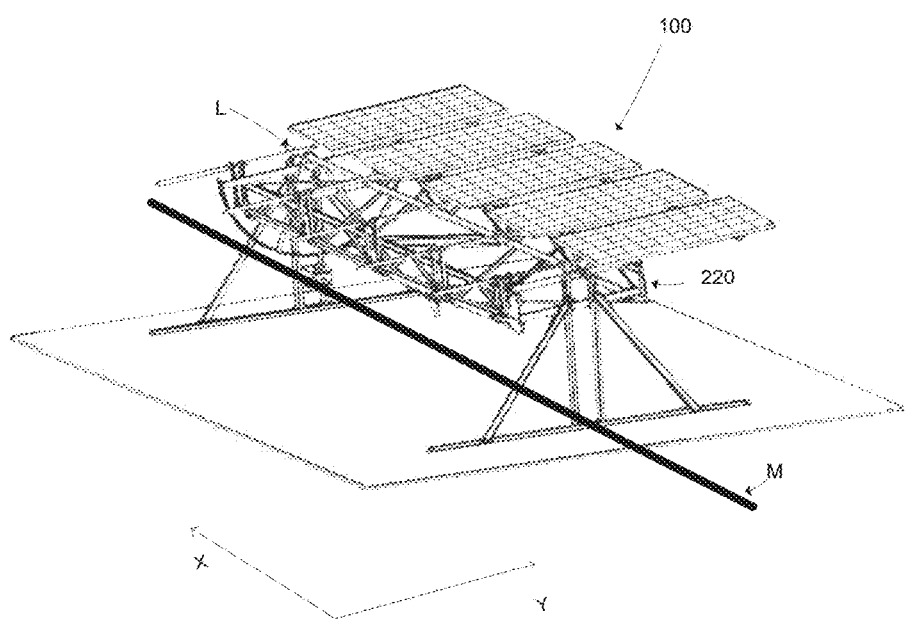
FIG. 9 shows a perspective view of a single module subsystem of a two-axis tracking system according to an aspect of the present disclosure.

As described above, the photovoltaic panel mounting positions in FIG. 8 may be flexibly set up on the fixing beam truss structure 220 (as shown in FIG. 9), and in turn the fixing beam truss structure 220 is set up on the supporting structure. In an embodiment, the supporting structure is similar to a combination of the high and low supporting stands in FIGS. 1-7. In another embodiment, the supporting structure may be two sets of supporting stands that are placed in parallel and of a same height. Furthermore, the entire system comprises a first direction rotation control mechanism (which will be described below) for controlling the rotation of the fixing beam truss structure 220 (including all photovoltaic module system mounting positions on it) about the first direction shaft L. The first direction shaft L extends in the X-direction, and then the entire fixing beam truss structure 220 and the photovoltaic panels A-J mounted on it may rotate about the first direction shaft L in the Y-direction.

Likewise, the photovoltaic panel mounting positions may comprise a system for controlling the rotation of the mounting positions in a second direction. As shown in the figure, the photovoltaic panel mounting positions aligned next to each other have a common second direction rotation shaft. The photovoltaic panel mounting positions A and B comprise a second direction rotation shaft K1, the photovoltaic panel mounting positions C and D comprise a second direction rotation shaft K2, the photovoltaic panel mounting positions E and F comprise a second direction rotation shaft K3, the photovoltaic panel mounting positions G and L comprise a second direction rotation shaft K4, the photovoltaic panel mounting positions I and J comprise a second direction rotation shaft K5. All the second direction rotation shafts K1 to K5 are flexibly connected by a second direction rotation shaft control rod K (for a simple illustration, the second direction rotation shaft control rod K is shown in FIG. 8 to connect only the second rotation shafts K1, K2 and K3, however, in practice, the second direction rotation shaft control rod K will continue to extend until it is connected to second the second rotation shafts K4 and K5). The second direction rotation shaft control rod K will be moved back and forth horizontally when driven by a second direction control motor. By means of this horizontal back-and-forth movement, all the second direction rotation shafts K1 to K5 are brought into rotation in the X-direction by way of the flexible connection, so that the photovoltaic panel mounting positions A to J on it also rotate in the X-direction.

Thus, a single module subsystem 100 of the two-axis tracking system shown in FIG. 8 may bring the photovoltaic panels A to J that it carries into rotations in both X- and Y-directions that are perpendicular to each other. In an embodiment, the rotations in the X- and Y-directions may occur simultaneously. Thus, the photovoltaic panels A to J may track the sunlight in both the south-north and east-west directions, so that the photovoltaic panels are kept at a best angle to the sunlight ray at any time, thereby realizing an optimal utilization of the sunlight.

FIG. 9 shows a perspective view of a single module subsystem 100 of a two-axis tracking system according to an embodiment of the present disclosure. For clarity, the X- and Y-directions in FIG. 9 are same as the X- and Y-directions in FIG. 8. Meanwhile, in order not to occlude other module subsystems, only five photovoltaic panels are shown as mounted. However, in the practice, more photovoltaic panels may be mounted. FIG. 9 shows from top to bottom that: the photovoltaic panels are laid on the photovoltaic panel mounting positions, multiple photovoltaic panel mounting positions are mounted on the fixing beam truss structure, and the fixing beam truss structure in turn is set up on the supporting structure. The first direction shaft L passes through the fixing beam truss structure in the X-direction. A front supporting pillar and a back supporting pillar of the supporting structure support the fixing beam truss structure and the first direction shaft L. On either of the supporting pillars of the supporting structure, a first direction rotation control motor is installed for controlling the rotation of the fixing beam truss structure about the first direction shaft L. According to an embodiment, the first direction shaft L is fixed on the front supporting pillar and the back supporting pillar of the supporting structure. The fixing beam truss structure 220 is flexibly set on the first direction shaft L (for example via bearing structures). In turn on the fixing beam truss structure 220, multiple second direction rotation shafts in the Y-direction (for example K1-K5 in FIG. 8) are configured. On each of the second direction rotation shafts, two or more photovoltaic panel mounting positions are arranged. In other embodiments, more photovoltaic panel mounting positions, such as three, four, five or more, may be arranged on each second direction rotation shaft.

In order to control the rotation of the fixing beam truss structure in the Y-direction, the module subsystem further comprises a first direction rotation shaft M. At both ends of the first direction rotation shaft M, universal couplers (not shown) are provided to couple with the other first direction rotation shaft M of the previous module subsystem and the next module subsystem. The first direction rotation shaft M is rotatable, and to coil, by its rotation the traction rope (which may be a traction rope or fiber rope) wound thereon into motion, thereby pulling the fixing beam truss structure into rotation. The first direction rotation shaft M in turn connects to the first direction rotation control motor (not shown in FIG. 9). The first direction rotation control motor is a part of the first direction rotation control mechanism. The first direction rotation control mechanism further comprises a control circuit. The control circuit may be a circuit board for control use. The control motor is a device that may rotate the first direction rotation shaft M according to a control signal outputted by the controller, and it may be implemented as, for example, a winch, a servomotor, a chain system, or other available transmission systems. A solar motion tracking sensor (not illustrated in the figure) is disposed on each of the module subsystems in the two-axis tracking system. The controller outputs a control signal based on the output signal from the solar motion tracking sensors to drive the control motor in real-time, and thus to adjust the rotation angle of the first direction rotation shaft M in the Y-direction, so as to adjust the rotation of the fixing beam truss structure in the Y-direction through a mechanical linkage, so that the rotation angles of all the photovoltaic panels arranged on the photovoltaic panel mounting positions on the fixing beam truss structure are adjusted to adapt to the motion track of the sun during the daytime.

In order to control the rotation of all the photovoltaic panels on the fixing beam truss structure in the X-direction, the module subsystem further comprises a second direction rotation control mechanism disposed on a side of the fixing beam truss structure. The second direction rotation control mechanism rotates all the second direction rotation shafts via a second direction rotation shaft control rod K, so that the photovoltaic panels on the structure will rotate in the X-direction.

Thus, the single module system may bring all the photovoltaic panels on it into rotation in both X- and Y-directions, thereby enabling a two-axis rotation for tracking the sun.

FIG. 10A, 10B are schematic views from different perspectives of a single module subsystem 100 of each photovoltaic tracking subsystem. FIG. 10A is a side view which shows that each module subsystem 100 comprises: two fixed supporting pillars 306, a first direction rotation shaft M, a plurality of photovoltaic module subsystem mounting positions 302, and a guiding track 304, with other parts not illustrated, for example, a traction rope. A plurality of photovoltaic panels are mounted on the photovoltaic module subsystem mounting positions 302. As can be seen from this figure, both ends of the first direction shaft L are disposed on the top of the two supporting pillars 306. The rotation of the first direction rotation shaft M brings the fixing bean truss structure into rotation. The guiding track 304 serves to facilitate the rotary positioning.

A sectional view of the supporting structure and the rotation control mechanism for the single module subsystem 100 may be similar to the sectional view of the single-axis tracking system in FIG. 2B, and an unnecessary repetition is not given here. In particular, on the front side of the fixing beam truss structure (which is shown in a simplified form), the photovoltaic panel mounting positions are mounted, and on the two ends of the back side of the fixing beam truss structure, the connection nodes of the traction rope are arranged respectively. The both ends of the traction rope are connected to corresponding connection nodes on both ends, respectively, and coil on the first direction rotation shaft M in the middle, forming a loop traction rope pulling system. Meanwhile, the back side of the fixing beam truss structure is coupled to the guiding track 304, which is parallel to the inclined rotating direction of the fixing beam truss structure, i.e. it is oriented to the second direction (i.e. placed in the east-west direction in one embodiment). The part of the traction rope near the fixing beam is put into the guiding track 304.

According to an embodiment of the present disclosure, in the tracking control, based on the signal from the tracking sensors (not shown), the transmission control device adjusts the angle as follows: the controller determines the rotating direction and the rotating angle based on the signal from the tracking sensors; the first direction rotation shaft M is brought into clockwise or anti-clockwise rotation by the control motor; the clockwise (or anti-clockwise) rotation of the first direction rotation shaft M will coil the traction rope and shorten it in the left or right direction (i.e. the east or west direction), and thus pulls one side of the connected fixing beam truss structure, and tilt either side of the fixing beam truss structure, thereby adjusting the inclination angle in the Y-direction of the photovoltaic modules on the structure, so that the photovoltaic module subsystem may continuously adjust its light receiving angle with the varying angle of the solar motion in a day, thus increasing the conversion efficiency and raising the amount of generated power. The guiding track 304 ensures that the traction rope 308 remains in a tensioning state during the rotation, and therefore, in spite of the tilt angle of the fixing beam truss structure, the traction rope 308 may bring the fixing beam truss structure into motion.

FIG. 10B is an enlarged sectional view of the supporting structure. As can be seen, FIG. 10B shows only one of the two supporting structure, and the other one may be a complete duplication of the structure of this figure. The supporting structure comprises: a central supporting pillar 312, which is set up on a bottom beam 314 in a horizontal orientation. The two ends of the bottom beam 314 are inserted into holding blocks 310, respectively. The holding blocks are placed on the installation ground. FIG. 10B further shows that the central supporting pillar is steadily set up on the bottom beam 314 via two triangular side bracing pillars. In an alternative embodiment, the two triangular side bracing pillars can be omitted. On the top of the central supporting pillar 312, a first direction shaft L is fixed. The way of fixation may be welding, or tightly pressing the shaft L via holding plates, or by other ways. It should be understood that this fixation can be freely selected according to the conditions in the field. The enlarged box in FIG. 10B shows a lower part of the central supporting pillar near the bottom beam 314, on which a part of the rotation control mechanism is mounted. Specifically, a first direction rotation shaft M is inserted, and the traction rope 308 is coiled around the first direction rotation shaft M.

FIG. 11 shows another type of side view of a single module subsystem of a two-axis tracking system according to an embodiment of the present disclosure. The reference numeral 410 represents the first direction rotation control mechanism, which has been described above, for bringing the first direction rotation shaft M into rotation. As described above, the first direction rotation control mechanism 410 comprises a first direction control motor. This control motor is a device that can bring the first direction rotation shaft M into rotation according to the control signal outputted from the controller (not shown). The controller outputs a control signal based on the output signal from the solar motion tracking sensors to drive the control motor in real-time, so as to adjust the rotating angle of the first direction rotation shaft M in the Y-direction.

The reference numeral 420 in FIG. 11 represents the second direction rotation control mechanism, which has been described above, for bringing the second direction rotation shaft control rod K into rotation. The second direction rotation control mechanism 420 comprises a second direction control motor. This second control motor is a device that can bring the second direction rotation shafts K1-K5 into rotation according to the control signal outputted from the controller (not shown).

It can be recognized that although the single module subsystem as illustrated in FIG. 11 may have both the first direction rotation control mechanism and the second direction rotation control mechanism, the first direction rotation control mechanism and the second direction rotation control mechanism may be configured in different module subsystems, respectively. For example, when multiple module subsystems are aligned in longitudinal columns one after another, the first module subsystem of the alignment may have the first direction rotation control mechanism, while a module subsystem in the middle of the alignment may have the second direction rotation control mechanism.

Figure 12A:
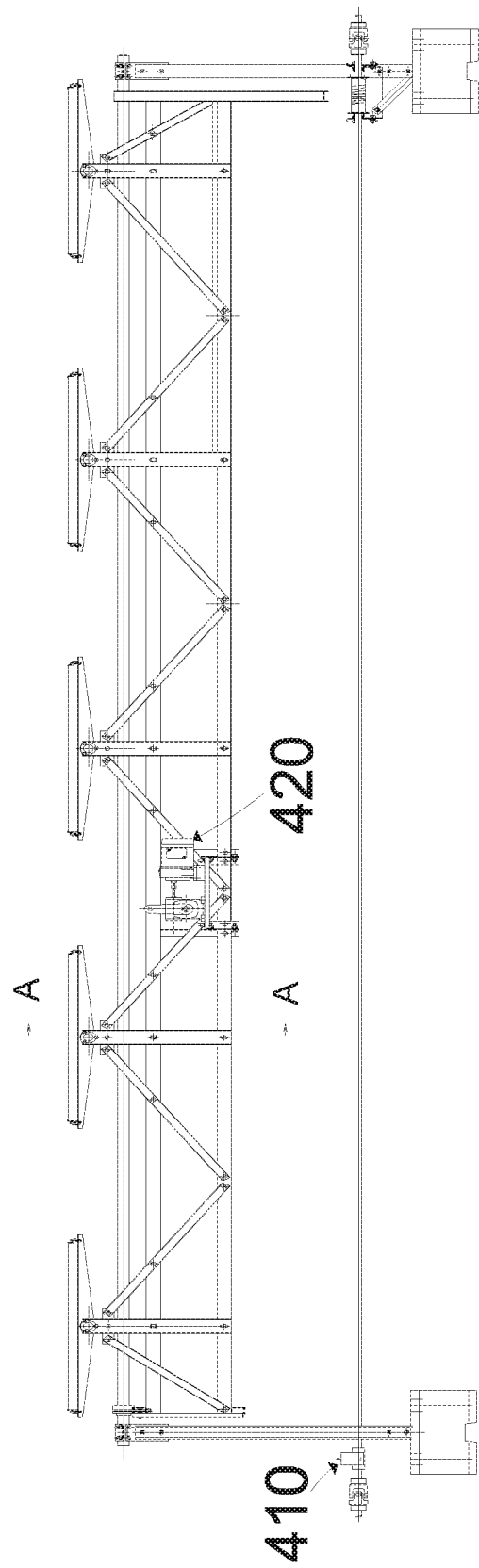

FIG. 12A is a schematic side view of a single module subsystem 100 which is supplemented with a control motor and a holding block on the basis of FIG. 10A. One of its purposes is to show the positions of the first direction rotation control mechanism 410 and the second direction rotation control mechanism 420 in the system. As can be seen, the first direction rotation control mechanism is arranged on the lower part of the entire subsystem, while the second direction rotation control mechanism 420 is arranged on a side of the fixing beam truss structure. FIG. 12B shows the sectional view along A-A direction of FIG. 12A, so as to more clearly illustrate the second direction rotation control mechanism 420 and the fixing beam truss structure 430. As can be seen, on either side of the fixing beam truss structure 430, a bracket structure 440 is arranged, and the second direction rotation control mechanism 420 is fixed on the bracket structure 440 through bolts.

FIG. 12C shows a more detailed schematic operational principle diagram of the second direction rotation control mechanism on the same side, in which a part of the structure is omitted. This is intended to make the whole description much clear for illustrative purpose, instead of limiting the concretely implemented structure. FIG. 12C shows two sets of the same structure, so as to more clearly express the functional principles of the present disclosure. Taking a set of structures on the left side of the figure as an example, numeral 450 represents a photovoltaic panel mounting position. The arrow direction X is the same as the X-direction in FIG. 8. In the illustrated embodiment, the photovoltaic panel mounting position 450 may rotate in the X-direction around the second direction rotation shaft K1. In order to control the rotation of the photovoltaic panel mounting position 450 in the X-direction, the second direction rotation shaft of the photovoltaic panel mounting position 450 is fixedly connected to a traction rod 460. In the embodiment as shown in the figure, the traction rod 460 is perpendicularly coupled to the second direction rotation shaft of the photovoltaic panel mounting position 450. Certainly, the traction rod 460 may also be fixedly coupled to the photovoltaic panel mounting position 450 at a certain angle (for example 80 degrees, 60 degrees and etc.). The second direction rotation control mechanism 420 comprises a single second direction control motor 480 as shown in the figure. The second direction control motor 480 rotates, bringing the revolving rod 490 into rotation. An example for rotation is shown in the three positions a, b and c in the figure. Whereas the revolving rod 490 is in turn flexibly connected to the horizontal second direction rotation shaft control rod K. Those skilled in the art will understand, as the revolving rod 490 rotates, the second direction rotation shaft control rod K is moved back and forth in the X-direction. Thus, a displacement of the second direction rotation shaft control rod K in the X-direction as controlled by the second direction control motor 480 is realized. The second direction rotation shaft control rod K is in turn connected to the traction rod 460 by way of a flexible connection (for example, via a hinge). As the second direction control motor 480 brings the second direction rotation shaft control rod K into a back-and-forth movement in the X-direction, the back-and-forth movement of the second direction rotation shaft control rod K pulls the traction rod 460. Since the second direction rotation shaft control rod K is flexibly connected with the traction rod 460, the traction rod 460 may rotate, as shown in the positions A and B in the figure. Since the traction rod 460 is fixedly connected with the photovoltaic panel mounting position 450, as the traction rod 460 rotates from position A to position B, the photovoltaic panel mounting position 450 also rotates in the X-direction around the second direction rotation shaft K1 together with it. In an embodiment, a single photovoltaic panel mounting position 450 rotates in the X-direction around the second direction rotation shaft K1 in a rotation range of +/−10 to 30 degrees.

Further, the second direction rotation shaft control rod K may be prolonged, and thus is connected to the traction rod 460' of the second set of photovoltaic panel mounting positions 450' on the right side of the figure. After that, the second direction rotation shaft control rod K may be further prolonged to a plurality of photovoltaic panel mounting positions of another photovoltaic module subsystem. Thus, by means of a single second direction control motor 480 and one second direction rotation shaft control rod K, a plurality of traction rods and photovoltaic panel mounting positions may be brought into rotation in the X-direction. In embodiment, based on the information from light sensor(s) configured on the tracking subsystem, the controller (not shown in the figure) sends a second direction rotation control signal to the second direction control motor 480, which brings the second direction rotation shaft control rod K into a horizontal back-and forth movement and thus brings multiple traction rods 460 and photovoltaic panel mounting positions 450 thereon into a rotation in the X-direction, thereby realizing a tracking adjustment with regards to the sunlight.

Figure 13:
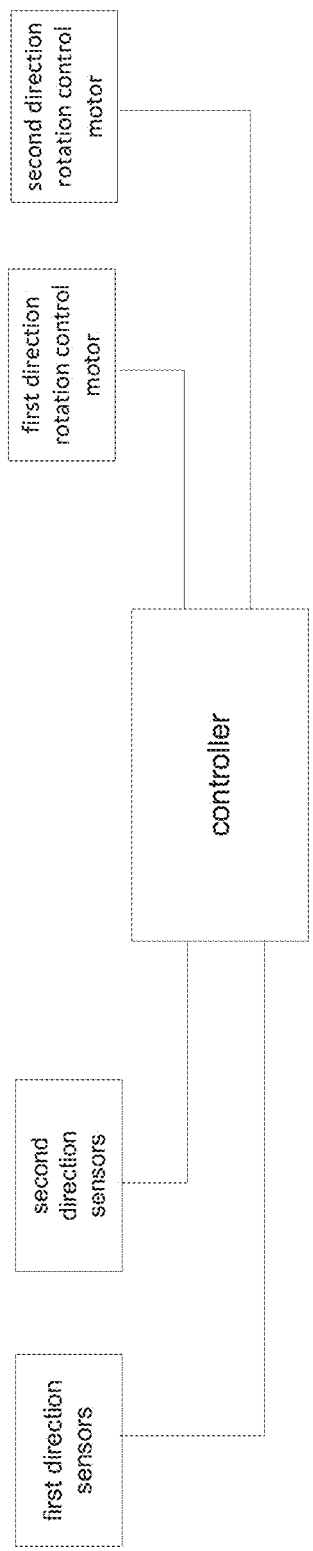
FIG. 13 shows a schematic view of a control system according to an aspect of the present disclosure.

FIG. 13 shows a schematic view of a control system according to an embodiment of the present disclosure. The first direction rotation control motor and the second direction rotation control motor of the present disclosure may be coupled to a common controller. This coupling may be performed via various conventional communication methods, such as, wired cable transmission or wireless transmission. When the whole photovoltaic power generation system is disposed on a large area, it is advantageous to employ a wireless transmission. For example, wireless transmission technologies such as WiFi, Bluetooth, 2.4 GHz band etc. can be employed to send a wireless control signal from a controller placed at a physical location to the first and second direction control motors on all the assemblies, thereby reducing the requirements for the wiring on the large area, reducing the costs and raising deployment efficiency. Likewise, by means of sensors in the first and second directions, the information about the sun in the first direction and the second direction may be collected in real-time. The controller generates and outputs a first direction rotation control signal and a second direction rotation control signal based on the real-time position information to control all the photovoltaic panels to rotate in real-time. The sensors may also be coupled to the controller in a wired or wireless manner. And, the sensors may take a variety of different implementing forms. For example, in an embodiment, the sensors may be photosensitive sensors arranged in different physical positions for receiving sunshine. Or in another embodiment, no sensor is required. Instead, the first direction rotation control signal and the second direction rotation control signal are generated by receiving real-time meteorological data from a third-party. The third-party real-time meteorological data may be real-time data received from a weather station or more accurate real-time solar position information provided by a third-party commercial weather forecast agency. Alternatively, the above means may used in combination to provide more accurate real-time position information about the sun. Thus, it should be understood that it is not required to place the sensors and controllers of the present disclosure near the photovoltaic system. Instead, they may remotely control the photovoltaic system on the entire large area, which substantially reduces the control costs and raises the control efficiency.

As will be appreciated, the control system in FIG. 13 may also be used to control the rotation of the rotation shaft 5 of the single-axis tracking system in FIGS. 1-7, and an unnecessary repetition is not given here.

FIG. 14 shows a schematic view of multiple module subsystems of a two-axis tracking system according to an embodiment of the present disclosure. The upper half on FIG. 14 is a side view of an interconnection of multiple module subsystems and the lower half is a top view of the interconnection of multiple module subsystems. FIG. 14 includes multiple module subsystems 100, 200, 300, and 400. As those skilled in the art will see, it may further comprise more module subsystems and may be connected and operated at the same time in a manner as described below.

The module subsystems 200, 300, 400 have the same structure as that of the module subsystems 100 described above with reference to FIGS. 8-13. And, the module subsystems 200, 300, 400 each comprise a first direction rotation shaft M, shown as M200, M300 and M400. M200, M300, M400 connected with each other via universal couplers, and an end of M200 is connected to the first direction rotation shaft M of the module subsystem 100 (on the rightmost side). The other end of the first direction rotation shaft M of the module subsystem 100 is connected to the first direction rotation control mechanism (not shown in the figure). The first direction rotation control mechanism comprises a first direction rotation control motor. Solar motion tracking sensors (not illustrated in the figure) are arranged on the respective module subsystems 100, 200, 300, 400 of the two-axis tracking system. A controller (for example, the controller as shown in FIG. 13) outputs a control signal based on an output signal from the sensors to drive the control motor in real-time, so as to adjust the rotating angle of the first direction rotation shaft M in the Y-direction. Via an universal coupler, a rotation of the first direction rotation shaft M brings the first direction rotation shaft M200, M300 and M400 into rotation, and thus adjusts the rotation of the fixing beam truss structure on the module subsystems 200, 300 and 400 in the Y-direction by way of a mechanical linkage, so that the tilt angles of all the photovoltaic panels on the fixing beam truss structures of all module subsystems vary. Thus, by means of a single control device and a single shaft, it is able to simultaneously change the rotating angles of photovoltaic panels of multiple module subsystems in the Y-direction.

Likewise, each photovoltaic panel mounting position of the module subsystems 200, 300, 400 comprises a second direction rotation shaft (not shown with reference numeral) in the Y-direction. By a second direction rotation shaft control rod K, all module subsystems 100, 200, 300, 400 are connected. A second direction rotation control shaft K of the module subsystem 100 is connected to a second direction rotation control mechanism. The second direction rotation control mechanism comprises a single second direction control motor 480 arranged between the modules M200 and M300. Under the instructions from a controller (for example, the controller as shown in FIG. 13), the second direction control motor 480 brings the second direction rotation shaft control rod K into a horizontal back-and-forth movement, thereby bringing the second direction rotation shafts of all photovoltaic panels on the module subsystems 200, 300, 400 into a rotation in the X-direction by way of a flexible connection. Thus, via a single control device and one single shaft, it is able to bring all the photovoltaic panels into a controlled rotation in the X-direction. In this embodiment, since four module subsystems are used, in order to homogenize the driving force in the horizontal direction, the single second direction control motor 480 is arranged in a central position, i.e. the position between M200 and M300. Thus, the left and right sides of the second direction control motor 480 in the horizontal direction each drive a second direction rotation shaft control rod K of substantially the same length, thereby balancing the power output. Because the present disclosure does not define the number of the connected module subsystems, as many module subsystems as possible may be coupled. According to the design of the present disclosure, one second direction control motor 480 may simultaneously bring all photovoltaic module mounting positions of about twenty to forty module subsystems into rotation.

By means of a single first direction rotation control mechanism and a second direction rotation control mechanism, the rotating angles of the photovoltaic panels on all module subsystems in both X- and Y-directions may be adjusted respectively, such that the photovoltaic panels are seamlessly and accurately adjusted to face the incident direction of sunlight perpendicularly. Therefore, the incident angle of solar power may be maximized, thus raising the efficiency of photovoltaic conversion. In a test system, in comparison to the single-axis system, the power generation efficiency may be increased by 10%-15%. Meanwhile, a set of tracking systems can be implemented for providing tracking control for a plurality of photovoltaic module subsystems, thereby substantially reducing the control costs.

Furthermore, the fixing beam truss structure is placed in the horizontal plane when in an unused state. The fixing beam truss structure employs a frame structure so that it has good tensile resistance in all three dimensions. Thus, the wind resistance of the whole photovoltaic tracking system is improved, thereby raising safety and durability.

Now referring to FIG. 15, FIG. 15 shows a schematic view of a matrix of two-axis tracking systems according to another embodiment of the present disclosure. FIG. 15 further shows a lateral side similar to, for example, FIGS. 10B and 11. Three sets of longitudinal columns 15-1, 15-2 and 15-3 are illustrated in FIG. 15. It can be appreciated that this is only exemplary embodiment, and the present disclosure is not limited to three sets of longitudinal columns and may form up to tens of sets of system longitudinal columns. Each system longitudinal column has a structure of the longitudinal column of the module subsystems 200, 300, 400 (or more) connected in series, and enables a rotation control in the first and second direction as shown above. In comparison to FIGS. 10B and 11, the two triangular side supporting pillars, which are required in order to set up the central supporting pillar 312 on the bottom beam 314, are omitted. Rather, between the central supporting pillars of the corresponding module subsystems of two adjacent system longitudinal columns, a horizontal connection and reinforcement is achieved by means of a longitudinal column beam 810, so that total matrix of module subsystems may be connected together in a manner that they rely on each other. The longitudinal column beam 810 in FIG. 15 is shown in a disconnected line, which means it may comprise one or more sets of system longitudinal columns which are not illustrated. When several tens of system longitudinal columns are connected with each other by way of the longitudinal column beam 810, even if no triangle two side supporting pillar is arranged on each subsystem, the wind resistance and mounting stability may be still greatly increased. Thus, the overall mounting stability of the entire matrix of two-axis tracking system is realized, and by omitting the two triangular side supporting pillars on each subsystem, the costs for mounting pillars are greatly saved. An additional benefit in costs and effects is achieved. Furthermore, in this matrix, a single controller can be employed as shown in FIG. 13 to send rotation signals to all the first and second direction rotation control motors of the whole matrix in a wireless manner, so as to control the photovoltaic panels on a large area in a more efficient and energy-saving manner, thereby realizing a centralized control.

The novel solar inclination angle single-axis tracking system according to the above embodiments of the present disclosure has the following advantages:

1. a single-axis tracking in one direction or a two-axis tracking in two directions is performed simultaneously on multiple assemblies, so that a great number of photovoltaic module assemblies in an area may be controlled simultaneously to track the solar motion in real-time, thus it is ensured that the photovoltaic modules are always at a best light-receiving angle during a day, thereby enhancing the conversion efficiency and raising the amount of generated power;

2. the south-north inclination angles of the photovoltaic modules are controlled by means of two triangular fixation supporting stands of different heights, so that they form an optimal angle to the sunlight ray, and the sunlight is received in winter and summer in a balanced manner, thereby substantially raising the seasonal power generation efficiency;

3. the scheme ensures a tensioning state of the traction rope, thereby enhancing the effectiveness of the rotation;

4. the winding structure of the stop nails and the traction rope provides a more powerful rotating effect;

5. a simultaneous control of multiple sets of tracking subsystems connected together can be realized via a single controller and rotation shaft, so that a simultaneous adjustment of the east-west inclination angles of a plurality of photovoltaic modules is enabled, thereby substantially improving the control efficiency and reducing the costs; and 6. by way of the bearing structure and the rotating rod, the flexibility of the rotation of the photovoltaic modules is raised and also the wind resistance is enhanced.

Although the technical solutions of the present disclosure have been described according to favored embodiments of the present disclosure, it is apparent to those skilled in the art that a variety of variations can be performed on the methods, method steps or orders of the steps described in the present disclosure without departing from the concepts, spirit or scope of the present disclosure. Furthermore, the disclosed devices can be modified and multiple components can be excluded or replaced in the present disclosure and the same or similar results can be achieved. All those similar alternatives and modifications that are apparent to those skilled in the art are deemed to fall within the spirit, scope and concepts defined in the appended claims of the present disclosure.

What is claimed is:

1. A multi-assembly two-axis tracking system for photovoltaic module, comprising:

several independent photovoltaic module tracking subsystems, which are aligned in longitudinal columns one after another in a first direction, and each photovoltaic module tracking subsystem comprises:

a fixing beam truss structure (220), on the front side of which multiple photovoltaic panel mounting positions are mounted and on two ends of the back side of which connection nodes for a traction rope (308) are mounted, respectively, and the multiple photovoltaic panel mounting positions are used for mounting photovoltaic panels;

two fixation supporting stands (6, 7), on which a first end of a first direction shaft (L) is fixed to one of the two fixation supporting stands and a second end of the first direction shaft (L) is fixed to the other one of the two fixation supporting stands, and the fixing beam truss structure (220) is flexibly connected to the first direction shaft and can tilt and rotate around and with respect to the first direction shaft;

a traction rope (308), the two ends of which are connected to connection nodes on two ends of a back side of the fixing beam truss structure, respectively;

a first direction rotation shaft (M), around which the traction rope (308) is coiled a plurality of times and a middle part of the coiled traction rope is fastened to the first direction rotation shaft;

a guiding track (304), which is mounted on the back side of the fixing beam truss structure in conformity with a second direction, and the traction rope is positioned in the guiding track (304), and the second direction is orthogonal to the first direction in a horizontal plane;

universal couplers, which are arranged at both ends of the first direction rotation shaft and which are coupled to a first direction rotation shaft of a previous photovoltaic module tracking subsystem and a first direction rotation shaft of a next photovoltaic module tracking subsystem, wherein a direction rotation shaft of a first one of the several independent photovoltaic module tracking subsystems aligned in the longitudinal columns one after another is connected to a first direction rotation control mechanism via universal couplers, and a first direction rotation control mechanism controls a rotation of the first direction rotation shaft and thus actuates the traction rope and thus pulls the fixing beam truss structure and brings it into a rotation about the first direction around the first direction rotation shaft;

the multiple photovoltaic panel mounting positions are aligned next to each other in multiple rows on the front side of the fixing beam truss structure, wherein the multiple photovoltaic panel mounting positions aligned next to each other have a common second direction rotation shaft (K1, K2, K3, K4, K5), and all the second direction rotation shafts are flexibly connected by a second direction rotation shaft control rod (K), the second direction rotation shaft control rod (K) is moved back and forth horizontally in the first direction, and thus brings all the second direction rotation shafts into a rotation about the second direction by way of the flexible connection, so that photovoltaic panel mounting positions on it are brought into a rotation about the second direction; and wherein a second direction rotation shaft control rod of a middle one of the several independent photovoltaic module tracking subsystems aligned one after another in longitudinal column is connected to a second rotation control mechanism.

2. The multi-assembly two-axis tracking system of claim 1, wherein the first rotation control mechanism comprises a first direction rotation control motor and the second rotation control mechanism comprises a second direction rotation control motor, the first direction rotation control motor and the second direction rotation control motor are coupled to a controller in a wired or wireless manner, and the controller controls the rotation of the first direction rotation control motor and the second direction rotation control motor based on solar position real-time information, and thus brings the fixing beam truss structure into a rotation in the first direction and brings the photovoltaic panel mounting positions into a rotation in the second direction.

3. The multi-assembly two-axis tracking system of claim 2, wherein the second direction rotation shaft of each photovoltaic panel mounting position is fixedly connected with a traction rod (460) which is flexibly connected to the second direction rotation shaft control rod, which is in turn flexibly connected to the second direction rotation control motor via a revolving rod (490), the second direction rotation control motor brings the revolving rod into rotation and thus pulls the second direction rotation shaft control rod and brings it into a back and-forth movement in the first direction, so that the back-and-forth movement of the second direction rotation shaft control rod pulls the traction rod and thus brings the second direction rotation shaft control rod into rotation and thus brings the photovoltaic panel mounting positions into rotation about the second direction.

4. The multi-assembly two-axis tracking system of claim 3, wherein the fixing beam truss structure is a frame-shaped, flat structure, and multiple sets of bearing structures are arranged on a central line of the fixing beam truss structure, wherein the first direction shaft passes through the bearing structures, so that the fixing beam truss structure can flexibly rotate around and with respect to the first direction shaft; and the two fixation supporting stands both comprise: a central supporting pillar (312) and a horizontal bottom beam (314), and the central supporting pillar is in turn perpendicularly set on the horizontal bottom beam (314).

5. The multi-assembly two-axis tracking system of claim 4, wherein a bracket structure (440) is arranged on either side of the fixing beam truss structure of a middle photovoltaic module tracking subsystem that is connected to the second direction rotation control mechanism, and the second direction rotation control mechanism is fixed on the bracket structure by bolts.

6. The multi-assembly two-axis tracking system of claim 5, wherein the first direction rotation control motor is coupled, via the universal couplers, with the first direction rotation shafts of the several independent photovoltaic module tracking subsystems aligned one after another in longitudinal columns, and thus brings the first direction rotation shafts of the several independent photovoltaic module tracking subsystems into rotation in the first direction in unison.

7. The multi-assembly two-axis tracking system of claim 2, wherein the solar position real-time information comes from one or more of:

photosensitive sensors for receiving sunshine which are arranged on different physical locations;

real-time meteorological data from a third-party; and real-time solar position information provided by a third-party commercial weather forecast agency.

8. A matrix of multi-assembly two-axis tracking systems for photovoltaic modules, comprising:

multiple sets of system longitudinal columns (15-1, 15-2, 15-3), each set of system longitudinal columns being composed of a multi-assembly two-axis tracking system; and between fixation supporting pillars of corresponding module subsystems of two adjacent system longitudinal columns, a horizontal connection and reinforcement is achieved by means of a longitudinal column beam (810), so that an entire matrix of module subsystems can be connected together in a manner that they rely on each other, wherein the multi-assembly two-axis tracking system comprises:

several independent photovoltaic module tracking subsystems aligned in a longitudinal column one after another in a first direction, and each photovoltaic module tracking subsystem comprises:

a fixing beam truss structure (220), on the front side of which multiple photovoltaic panel mounting positions are mounted and on two ends of the back side of which connection nodes for a traction rope (308) are mounted, respectively, and the multiple photovoltaic panel mounting positions are used for mounting photovoltaic panels;

two fixation supporting stands (6, 7), on which a first end of a first direction shaft (L) is fixed to one of the two fixation supporting stands and a second end of the first direction shaft (L) is fixed to the other one of the two fixation supporting stands, and the fixing beam truss structure (220) is flexibly connected to the first direction shaft and can tilt and rotate around and with respect to the first direction shaft;

a traction rope (308), the two ends of which are connected to connection nodes on two ends a back side of the fixing beam truss structure, respectively;

a first direction rotation shaft (M), around which the traction rope (308) is coiled a plurality of times and a middle part of the coiled traction rope is fastened to the first direction rotation shaft;

a guiding track (304), which is mounted on the back side of the fixing beam truss structure in conformity with a second direction, and the traction rope is positioned in the guiding track (304), and the second direction is orthogonal to the first direction in a horizontal plane;

universal couplers, which are arranged at both ends of the first direction rotation shaft and which are coupled to a first direction rotation shaft of a previous photovoltaic module tracking subsystem and a first direction rotation shaft of a next photovoltaic module tracking subsystem, wherein a direction rotation shaft of a first one of the several independent photovoltaic module tracking subsystems aligned in the longitudinal column one after another is connected to a first direction rotation control mechanism via the universal couplers, and a first direction rotation control mechanism controls a rotation of the first direction rotation shaft and thus actuates the traction rope and thus pulls the fixing beam truss structure and brings it into a rotation about the first direction around the first direction rotation shaft;

the multiple photovoltaic panel mounting positions are aligned next to each other in multiple rows on the front side of the fixing beam truss structure, wherein the multiple photovoltaic panel mounting positions aligned next to each other have a common second direction rotation shaft (K1, K2, K3, K4, K5), and all the second direction rotation shafts are flexibly connected by a second direction rotation shaft control rod (K), the second direction rotation shaft control rod (K) is moved back and forth horizontally in the first direction, and thus brings all the second direction rotation shafts (L) into a rotation about the second direction by way of the flexible connection, so that photovoltaic panel mounting positions on it are brought into a rotation about the second direction; and wherein a second direction rotation shaft control rod of a middle one of the several independent photovoltaic module tracking subsystems aligned one after another in the longitudinal column is connected to a second rotation control mechanism.

9. The multi-assembly two-axis tracking system of claim 1, wherein the second direction rotation shaft control rod (K) extends to and is common to each of the multiple rows of photovoltaic panels at least within the photovoltaic module tracking subsystem.

10. The multi-assembly two-axis tracking system of claim 1, wherein the first direction rotation control mechanism and the second direction rotation control mechanism are located in different module subsystems from one another within the longitudinal column of the photovoltaic module tracking subsystems.

11. The multi-assembly two-axis tracking system of claim 1, further comprising at least one side bracing pillar extending from the central supporting pillar (312) to the horizontal bottom beam (314).

12. The multi-assembly two-axis tracking system of claim 1, wherein the middle part of the coiled traction rope is nailed into the rotation shaft by using a stop nail.

13. The multi-assembly two-axis tracking system of claim 8, wherein the middle part of the coiled traction rope is nailed into the rotation shaft by using a stop nail.

14. The multi-assembly two-axis tracking system of claim 1, wherein the fixing beam truss structure is a frame-shaped, rectangular flat structure which is made of rigid frame bars along the sides of the rectangle, that intersect in the diagonals in the frame for reinforcement purposes, multiple sets of bearing structures are arranged along the central line of the fixing beam truss structure, the first direction shaft (L) is inserted to pass through the multiple bearing structures, and multiple second direction rotation shafts (K1-K5) in the Y-direction are configured on the fixing beam truss structure.

15. The multi-assembly two-axis tracking system of claim 8, wherein the fixing beam truss structure is a frame-shaped, rectangular flat structure which is made of rigid frame bars along the sides of the rectangle, that intersect in the diagonals in the frame for reinforcement purposes, multiple sets of bearing structures are arranged along the central line of the fixing beam truss structure, the first direction shaft (L) is inserted to pass through the multiple bearing structures, and multiple second direction rotation shafts (K1-K5) in the Y-direction are configured on the fixing beam truss structure.

* * * * *